(12) United States Patent
Chulinin

(10) Patent No.: US 9,014,479 B2
(45) Date of Patent: Apr. 21, 2015

(54) METHOD AND SYSTEM FOR TEXT-IMAGE ORIENTATION

(71) Applicant: Yuri Chulinin, Moscow (RU)

(72) Inventor: Yuri Chulinin, Moscow (RU)

(73) Assignee: ABBYY Development LLC (RU)

( * ) Notice: Subject to any disclaimer, the term of this patent is extended or adjusted under 35 U.S.C. 154(b) by 308 days.

(21) Appl. No.: 13/715,896

(22) Filed: Dec. 14, 2012

(65) Prior Publication Data
US 2014/0169678 A1    Jun. 19, 2014

(51) Int. Cl.
*G06K 9/46*    (2006.01)

(52) U.S. Cl.
CPC ........................................ *G06K 9/46* (2013.01)

(58) Field of Classification Search
None
See application file for complete search history.

(56) References Cited

U.S. PATENT DOCUMENTS

| | | | |
|---|---|---|---|
| 4,950,167 A * | 8/1990 | Harris | 434/322 |
| 7,027,054 B1 * | 4/2006 | Cheiky et al. | 345/473 |

* cited by examiner

*Primary Examiner* — Stephen R Koziol
*Assistant Examiner* — Amandeep Saini
(74) *Attorney, Agent, or Firm* — LeighAnn Weiland; Veronica Weinstein

(57) ABSTRACT

The current application is directed to a method and system for automatically determining the sense orientation of regions of scanned-document images that include symbols and characters of languages that are not written as simple sequential strings of alphabetic characters. In one implementation, the sense-orientation method and system to which the current application is directed employs a relatively small set of orientation-marker characters that occur frequently in printed text and that lack rotational symmetry. In this implementation, text-character images within a region of a scanned-document image are compared to each of a set of orientation-marker patterns corresponding to orientation-marker characters in order to identify images corresponding to orientation-marker patterns in the text-containing region of the scanned-document image and to determine an overall sense orientation for the text-containing region of the scanned-document image based on the orientations of the identified orientation-marker patterns.

20 Claims, 36 Drawing Sheets

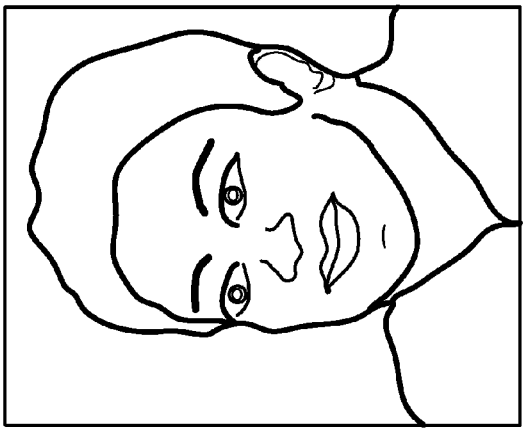

Handmade Search Engine by Grope

Fall Down Seven Times, Get up Eight

<My goal was supposed to be a math teacher, however, I ended up to be hired by a personal computer company.>

Taking programing classes in my college and purchasing a microcomputer seemed to be a trigger for working with a computer. One day, when I got news that a new, high performance computer had been on r sale, I chose the computer company as a part time job. The job was to answer to customer's questions in the show room, and I was allowed to use those computers anytime when I had nothing to do.

"You soon get tired of one thing. I wonder how you can keep taking care of high school students by three years as a teacher", one day an executive of the company said, which made me sense certainly. Then, I made a decision to get a job in the company.It was a small venture business where I was working for. While working there being given a lot of different roles at the developmental fields, every day was absolutely fulfillment for me. The company was happened to be sold by TOSHIBA, Inc., when it was my tenth year. If you work for a corporation, your goal should be getting a position as "president". However, TOSHIBA had more than thirty executives; many of them were so smart people, it was totally impossible for me to be the president.

Born in Tokyo in 1957. Graduate from Tokyo University of Science in 1979, got employed by Sword Machine Systems. Moving to Soft Bank Laboratory, Soft Bank, then funded Yahoo Inc, in January 1996. President & CEO Yahoo Inc from January 1996. Jazz music and reading science fiction as hobby and interest. His current favorite is "Perry Rhodan Universe Hero", which has been written by multiple writers novel relay in Germany.

METHOD AND SYSTEM FOR TEXT-IMAGE ORIENTATION

TECHNICAL FIELD

The current application is directed to automated processing of scanned-document images and other text-containing images and, in particular, to a method and system for determining a sense orientation for a region or block of an image containing text.

BACKGROUND

Printed, typewritten, and handwritten documents have long been used for recording and storing information. Despite current trends towards paperless offices, printed documents continue to be widely used in commercial, institutional, and home environments. With the development of modern computer systems, the creation, storage, retrieval, and transmission of electronic documents has evolved, in parallel with continued use of printed documents, into an extremely efficient and cost-effective alternative information-recording and information-storage medium. Because of overwhelming advantages in efficiency and cost effectiveness enjoyed by modern electronic-document-based information storage and information transactions, printed documents are routinely converted into electronic documents by various methods and systems, including conversion of printed documents into digital scanned-document images using electro-optico-mechanical scanning devices, digital cameras, and other devices and systems followed by automated processing of the scanned-document images to produce electronic documents encoded according to one or more of various different electronic-document-encoding standards. As one example, it is now possible to employ a desktop scanner and sophisticated optical-character-recognition ("OCR") programs running on a personal computer to convert a printed-paper document into a corresponding electronic document that can be displayed and edited using a word-processing program.

While modern OCR programs have advanced to the point that complex printed documents that include pictures, frames, line boundaries, and other non-text elements as well as text symbols of any of many common alphabet-based languages can be automatically converted to electronic documents, challenges remain with respect to conversion of printed documents containing text symbols of non-alphabetic languages into corresponding electronic documents.

SUMMARY

The current application is directed to a method and system for automatically determining the sense orientation of regions of scanned-document images that include symbols and characters of languages that are not written as simple sequential strings of alphabetic characters. In one implementation, the sense-orientation method and system to which the current application is directed employs a relatively small set of orientation-marker characters that occur frequently in printed text and that lack rotational symmetry. In this implementation, text-character images within a region of a scanned-document image are compared to each of a set of orientation-marker patterns corresponding to orientation-marker characters in order to identify images corresponding to orientation-marker patterns in the text-containing region of the scanned-document image and to determine an overall sense orientation for the text-containing region of the scanned-document image based on the orientations of the identified orientation-marker patterns.

BRIEF DESCRIPTION OF THE DRAWINGS

FIGS. 1A-B illustrates a printed document.

FIGS. 11A-D illustrate 16 different possible sense orientations for the text-containing region.

DETAILED DESCRIPTION

The current application is directed to a method and system for determining the sense orientation of a text-containing region of a scanned-document image by identifying the orientations of a number of orientation-marker characters or symbols within the text-containing region. In the following discussion, scanned-document images and electronic documents are first introduced, followed by a discussion of techniques for general orientation of text-containing scanned-document-image regions. Challenges with respect to orientating image regions containing text characters of a language that is not written as strings of sequential alphabetic symbols is then discussed. Finally, orientation-marker characters and orientation-marker patterns are described and a detailed description of the methods and systems for using orientation-marker patterns to determine the sense orientation of a text-containing region of a scanned-document image is provided.

Figure 1A:

FIGS. 1A-B illustrates a printed document. FIG. 1A shows the original document with Japanese text. The printed document 100 includes a photograph 102 and five different text-containing regions 104-108 that include Japanese characters. This is an example document used in the following discussion of the method and systems for sense-orientation determination to which the current application is directed. The Japanese text may be written in left-to-right fashion, along horizontal rows, as English is written, but may alternatively be written in top-down fashion within vertical columns. For example, region 107 is clearly written vertically while text block 108 includes text written in horizontal rows. FIG. 1B shows the printed document illustrated in FIG. 1A translated into English.

Figure 2:
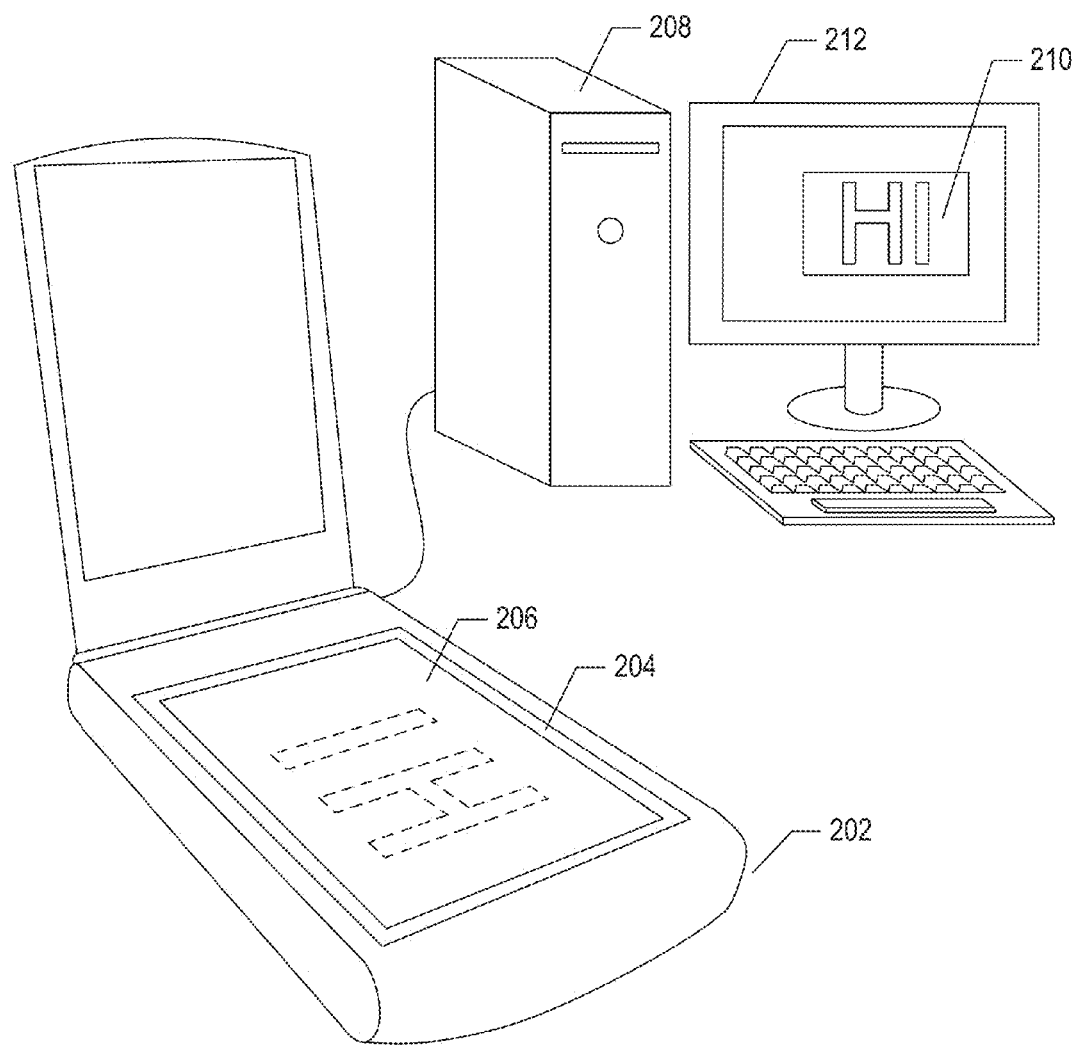
FIG. 2 illustrates a typical desktop scanner and personal computer that are together used to convert printed documents into digitally encoded electronic documents stored in mass-storage devices and/or electronic memories.

Printed documents can be converted into digitally encoded, scanned-document images by various means, including electro-optico-mechanical scanning devices and digital cameras. FIG. 2 illustrates a typical desktop scanner and personal computer that are together used to convert printed documents into digitally encoded electronic documents stored in mass-storage devices and/or electronic memories. The desktop scanning device 202 includes a transparent glass bed 204 onto which a document is placed, face down 206. Activation of the scanner produces a digitally encoded scanned-document image which may be transmitted to the personal computer ("PC") 208 for storage in a mass-storage device. A scanned-document-image-rendering program may render the digitally encoded scanned-document image for display 210 on a PC display device 212.

Figure 3:
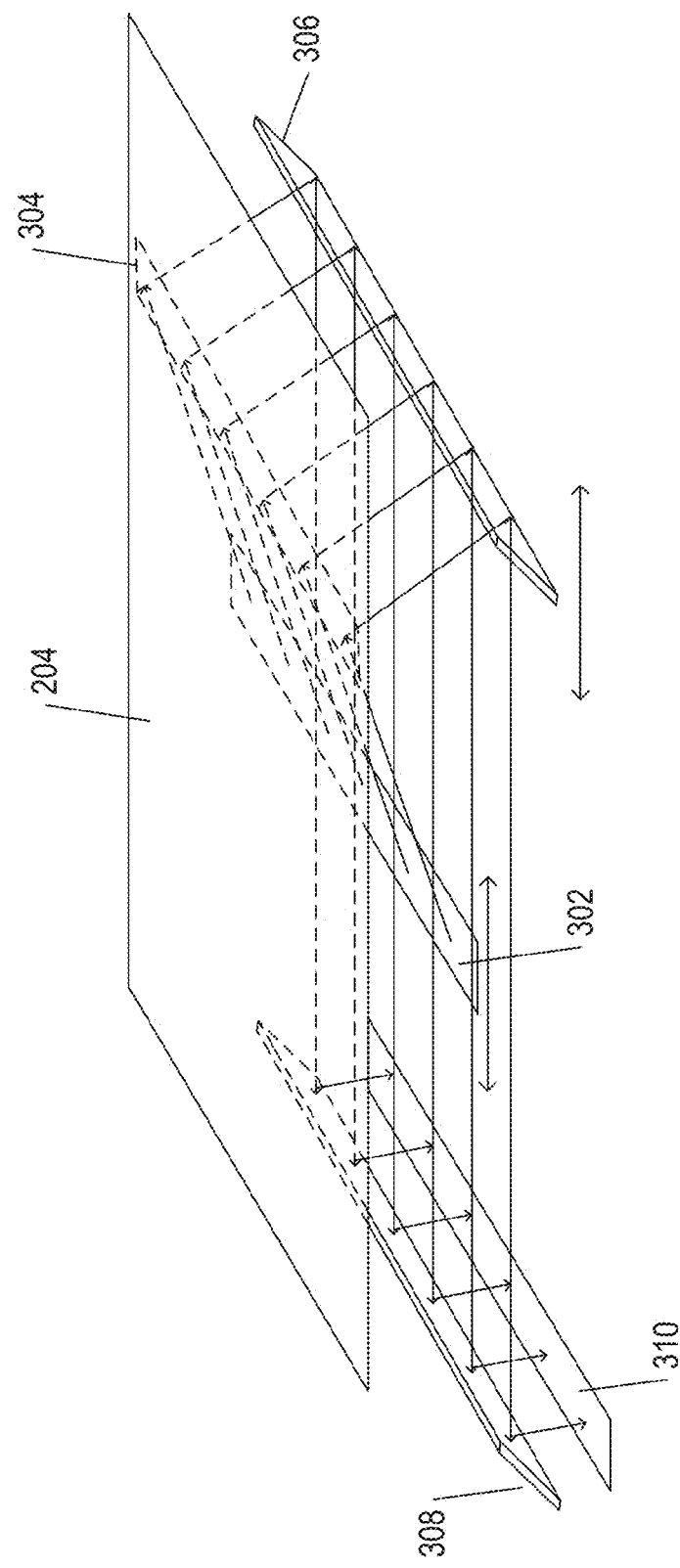
FIG. 3 illustrates operation of the optical components of the desktop scanner shown in FIG. 2.

FIG. 3 illustrates operation of the optical components of the desktop scanner shown in FIG. 2. The optical components in this charge-coupled-device ("CCD") scanner reside below the transparent glass bed 204. A laterally translatable bright-light source 302 illuminates a portion of the document being scanned 304 which, in turn, re-emits and reflects light downward. The re-emitted and reflected light is reflected by a laterally translatable mirror 306 to a stationary mirror 308, which reflects the emitted light onto an array of CCD elements 310 that generate electrical signals proportional to the intensity of the light falling on each of the CCD elements. Color scanners may include three separate rows or arrays of CCD elements with red, green, and blue filters. The laterally translatable bright-light source and laterally translatable mirror move together along a document to produce a scanned-document image. Another type of scanner is referred to as a "contact-image-sensor scanner" ("CIS scanner"). In a CIS scanner, moving colored light-emitting diodes ("LEDs") provide document illumination, with light reflected from the LEDs sensed by a photodiode array that moves together with the colored light-emitting diodes.

Figure 4:
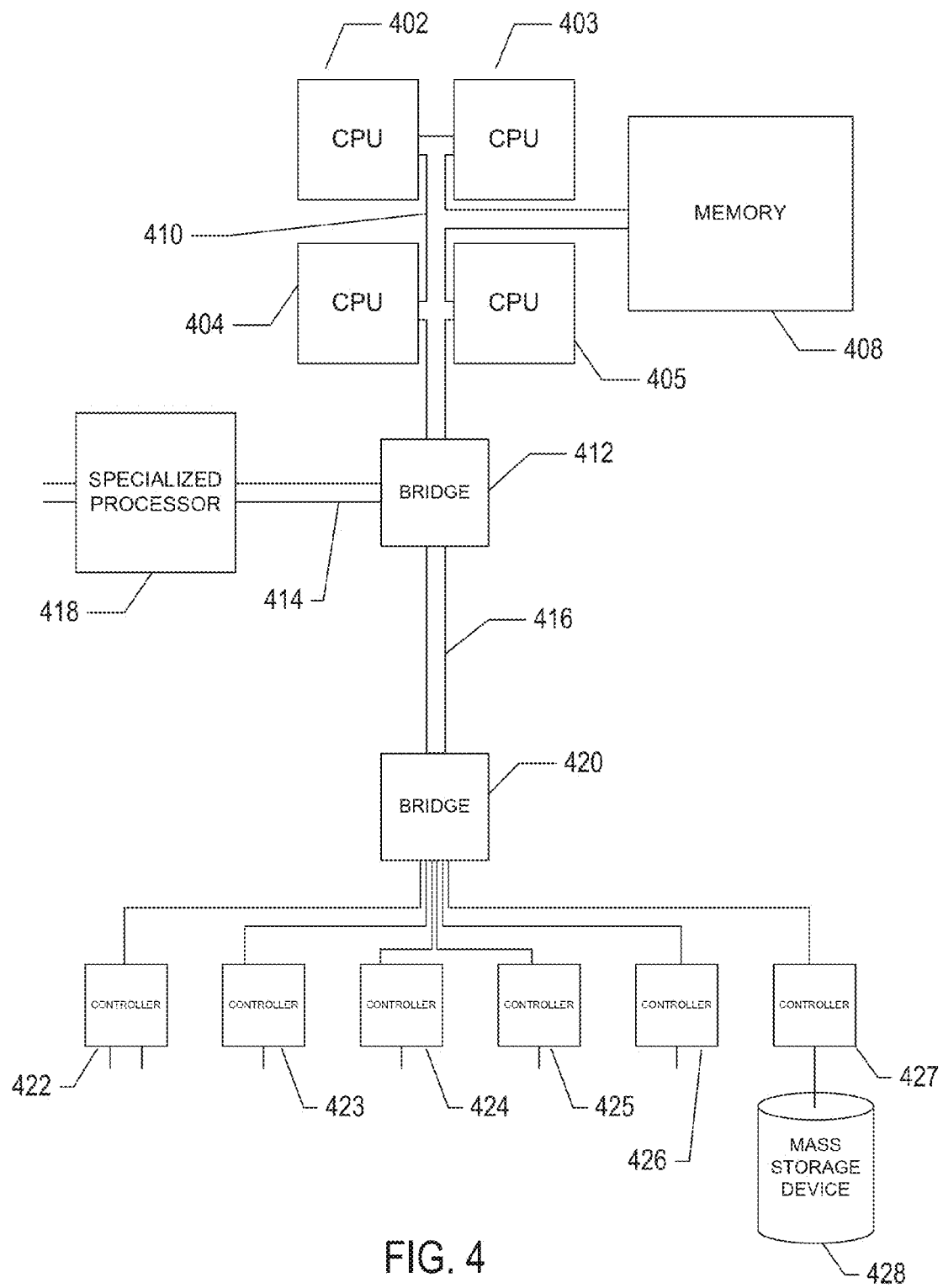
FIG. 4 provides a general architectural diagram for various types of computers and other processor-controlled devices.

FIG. 4 provides a general architectural diagram for various types of computers and other processor-controlled devices. The high-level architectural diagram may describe a modern computer system, such as the PC in FIG. 2, in which scanned-document-image-rendering programs and optical-character-recognition programs are stored in mass-storage devices for transfer to electronic memory and execution by one or more processors. The computer system contains one or multiple central processing units ("CPUs") 402-405, one or more electronic memories 408 interconnected with the CPUs by a CPU/memory-subsystem bus 410 or multiple busses, a first bridge 412 that interconnects the CPU/memory-subsystem bus 410 with additional busses 414 and 416, or other types of high-speed interconnection media, including multiple, high-speed serial interconnects. These busses or serial interconnections, in turn, connect the CPUs and memory with specialized processors, such as a graphics processor 418, and with one or more additional bridges 420, which are interconnected with high-speed serial links or with multiple controllers 422-427, such as controller 427, that provide access to various different types of mass-storage devices 428, electronic displays, input devices, and other such components, subcomponents, and computational resources.

Figure 5:
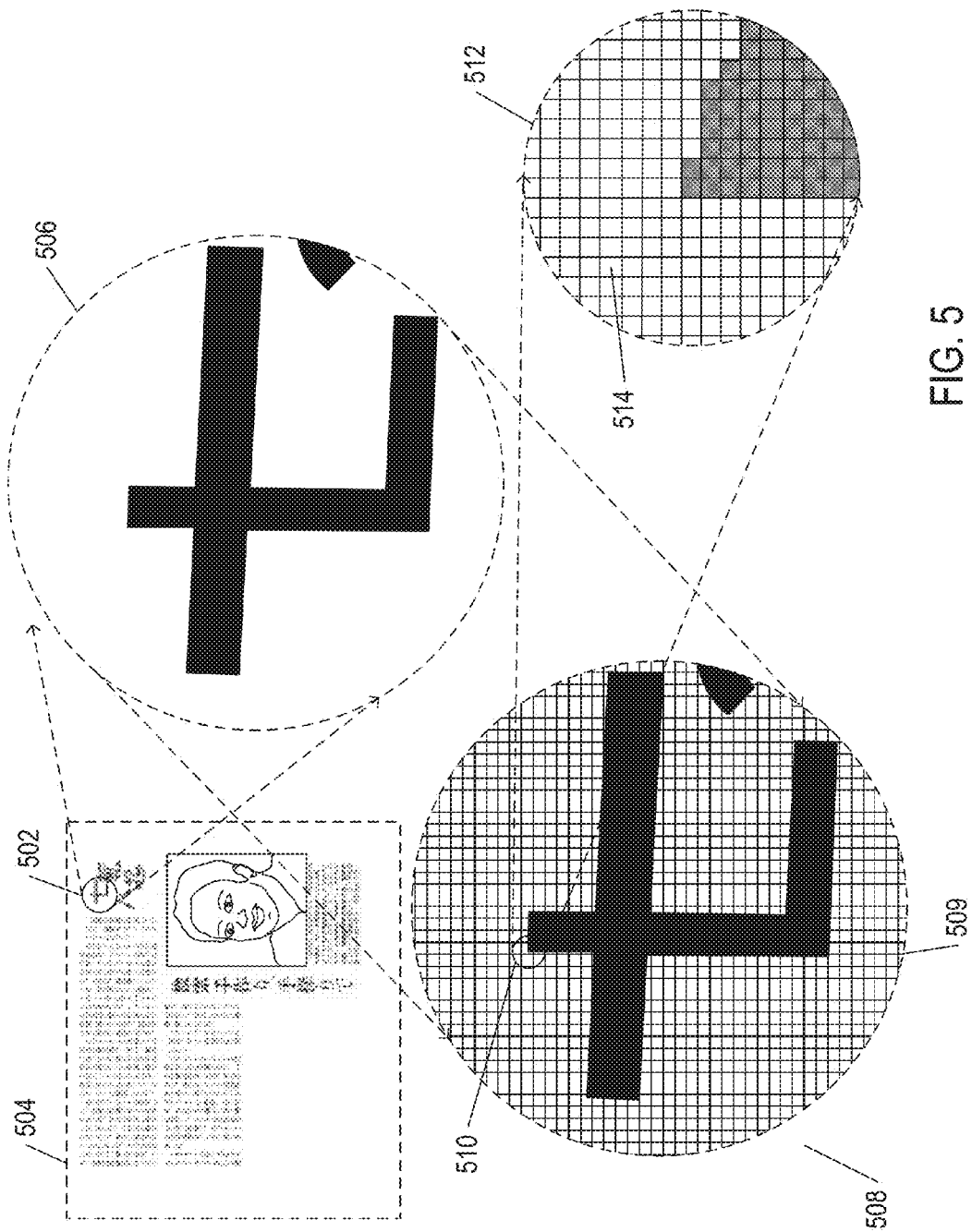
FIG. 5 illustrates digital representation of a scanned document.

FIG. 5 illustrates digital representation of a scanned document. In FIG. 5, a small disk-shaped portion 502 of the example printed document 504 is shown magnified 506. A corresponding portion of the digitally encoded scanned-document image 508 is also represented in FIG. 5. The digitally encoded scanned document includes data that represents a two-dimensional array of pixel-value encodings. In the representation 508, each cell of a grid below the characters, such as cell 509, represents a square matrix of pixels. A small portion 510 of the grid is shown at even higher magnification, 512 in FIG. 5, at which magnification the individual pixels are represented as matrix elements, such as matrix element 514. At this level of magnification, the edges of the characters appear jagged, since the pixel is the smallest granularity element that can be controlled to emit specified intensities of light. In a digitally encoded scanned-document file, each pixel is represented by a fixed number of bits, with the pixel encodings arranged sequentially. Header information included in the file indicates the type of pixel encoding, dimensions of the scanned image, and other information that allows a digitally encoded scanned-document-image rendering program to extract the pixel encodings and issue commands to a display device or printer to reproduce the pixel encodings in a two-dimensional representation of the original document. Scanned-document images digitally encoded in monochromatic grayscale commonly use 8-bit or 16-bit pixel encodings, while color scanned-document images may use 24 bits or more to encode each pixel according to various different color-encoding standards. As one example, the commonly used RGB standard employs three 8-bit values encoded within a 24-bit value to represent the intensity of red, green, and blue light. Thus, a digitally encoded scanned image generally represents a document in the same fashion that visual scenes are represented in digital photographs. Pixel encodings represent light intensity in particular, tiny regions of the image and, for colored images, additionally represent a color. There is no indication, in a digitally encoded scanned-document image, of the meaning of the pixels encodings, such as indications that a small two-dimensional area of contiguous pixels represents a text character.

By contrast, a typical electronic document produced by a word-processing program contains various types of line-drawing commands, references to image representations, such as digitally encoded photographs, and digitally encoded text characters. One commonly used encoding standard for text characters is the Unicode standard. The Unicode standard commonly uses 8-bit bytes for encoding American Standard Code for Information Exchange ("ASCII") characters and 16-bit words for encoding symbols and characters of many languages, including Japanese, Mandarin, and other non-alphabetic-character-based languages. A large part of the computational work carried out by an OCR program is to recognize images of text characters in a digitally encoded scanned-document image and convert the images of characters into corresponding Unicode encodings. Clearly, encoding text characters in Unicode takes far less storage space than storing pixilated images of text characters. Furthermore, Unicode-encoded text characters can be edited, reformatted into different fonts, and processed in many additional ways by word-processing programs while digitally encoded scanned-document images can only be modified through specialized image-editing programs.

Figure 6:
FIG. 6 shows six different regions within a scanned-document image recognized during an initial phase of scanned-document-image conversion, using the example document 100 shown in FIG. 1.

In an initial phase of scanned-document-image-to-electronic-document conversion, a printed document, such as the example document 100 shown in FIG. 1, is analyzed to determine various different regions within the document. In many cases, the regions may be logically ordered as a hierarchical acyclic tree, with the root of the tree representing the document as a whole, intermediate nodes of the tree representing regions containing smaller regions, and leaf nodes representing the smallest identified regions. FIG. 6 shows six different regions within the example document 100 shown in FIG. 1 recognized during an initial phase of scanned-document-image conversion. In this case, the tree representing the document would include a root node corresponding to the document as a whole and six leaf nodes each corresponding to one of the identified regions 602-607. The regions can be identified using a variety of different techniques, including many different types of statistical analyses of the distributions of pixel encodings, or pixel values, over the area of the image. For example, in a color document, a photograph may exhibit a larger variation in color over the area of the photograph as well as higher-frequency variations in pixel-intensity values than regions containing text. The details of how a scanned-document image is analyzed in order to identify various different regions, such as those shown in FIG. 6, are beyond the scope of the current document.

Once an initial phase of analysis has determined the various different regions of a scanned-document image, those regions likely to contain text are further processed by OCR routines in order to identify text characters and convert the text characters into Unicode or some other character-encoding standard. In order for the OCR routines to process text-containing regions, an initial orientation of the text-containing region needs to be determined so that various pattern-matching methods can be efficiently employed by the OCR routines to identify text characters. It should be noted that the images of documents may not be properly aligned within scanned-document images due to positioning of the document on a scanner or other image-generating device, due to non-standard orientations of text-containing regions within a document, and for other reasons. Were the OCR routines unable to assume a standard orientation of lines and columns of text, the computational task of matching character patterns with regions of the scanned-document image would be vastly more difficult and less efficient, since the OCR routines would generally need to attempt to rotate a character pattern at angular intervals over 360° and attempt to match the character pattern to a potential text-symbol-containing image region at each angular interval.

Figure 7:
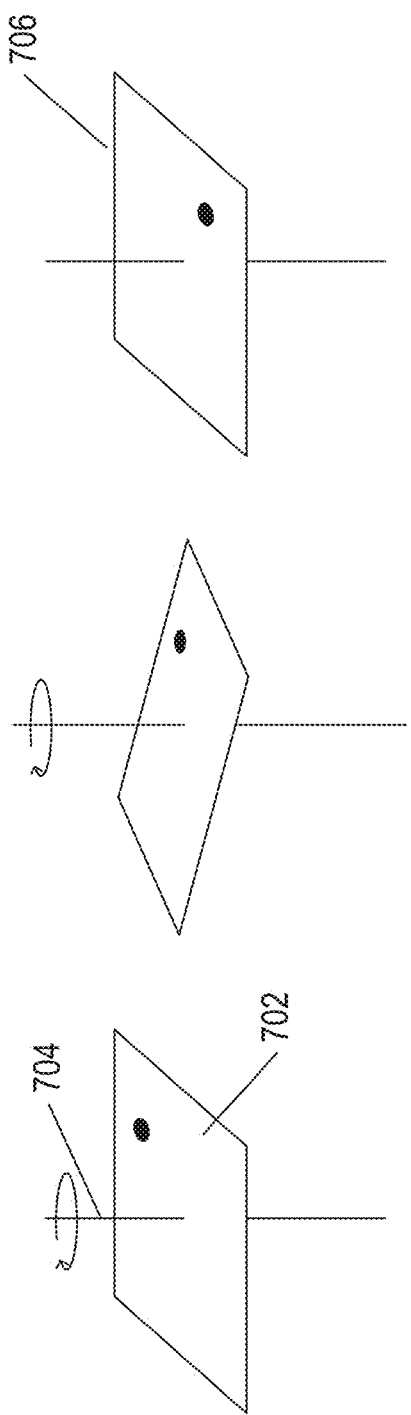
FIG. 7 illustrates a rotation in a horizontal plane.

To be clear, the initial orientation is concerned with rotations of the text-containing region in the horizontal plane. FIG. 7 illustrates a rotation in a horizontal plane. In FIG. 7, a square region of a scanned-document image 702 is positioned horizontally with a vertical rotation axis 704 passing through the center of the region. Rotation of the square region in a clockwise direction by 90° produces the orientation 706 shown at the right-hand side of FIG. 7.

Generally, once a text-containing region is identified, the image of the text-containing region is converted from a pixel-based image to a bitmap, in a process referred to as "binarization," with each pixel represented by either the bit value "0," indicating that the pixel is not contained within a portion of a text character, or the bit value "1," indicating that the pixel is contained within a text character. Thus, for example, in a black-and-white-text-containing scanned-document-image region, where the text is printed in black on a white background, pixels with values less than a threshold value, corresponding to dark regions of the image, are translated into bits with value "1" while pixels with values equal to or greater than the threshold value, corresponding to background, are translated into bits with value "0." The bit-value convention is, of course, arbitrary, and an opposite convention can be employed, with the value "1" indicating background and the value "0" indicating character. The bitmap may be compressed, using run-length encoding, for more efficient storage.

Figure 8:
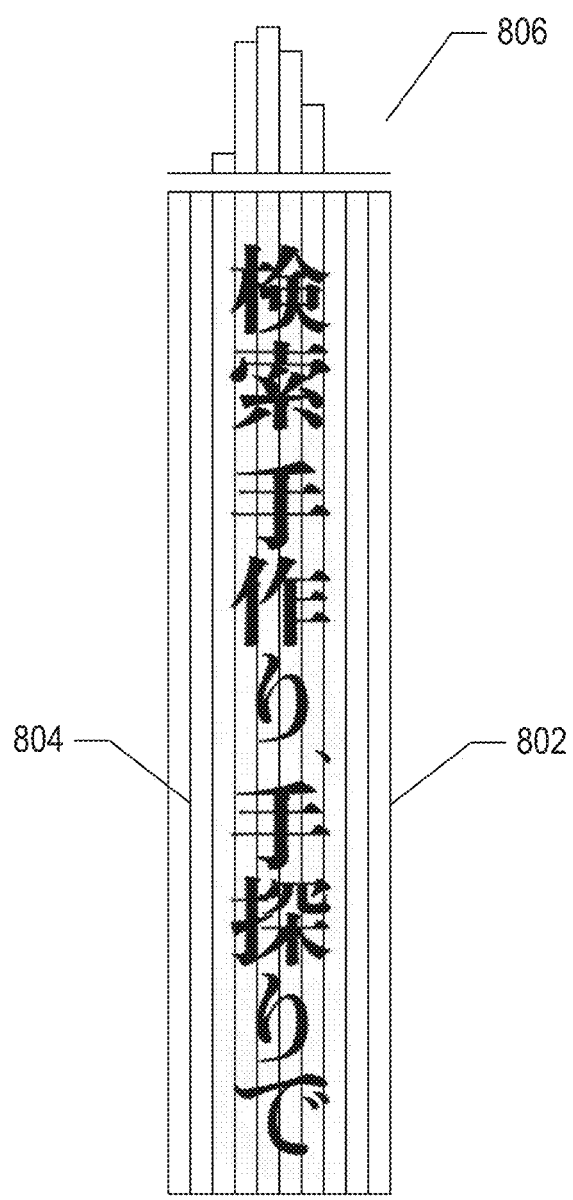
FIGS. 8-10 illustrate one approach to determining an initial orientation for a text-containing region.
Figure 9:
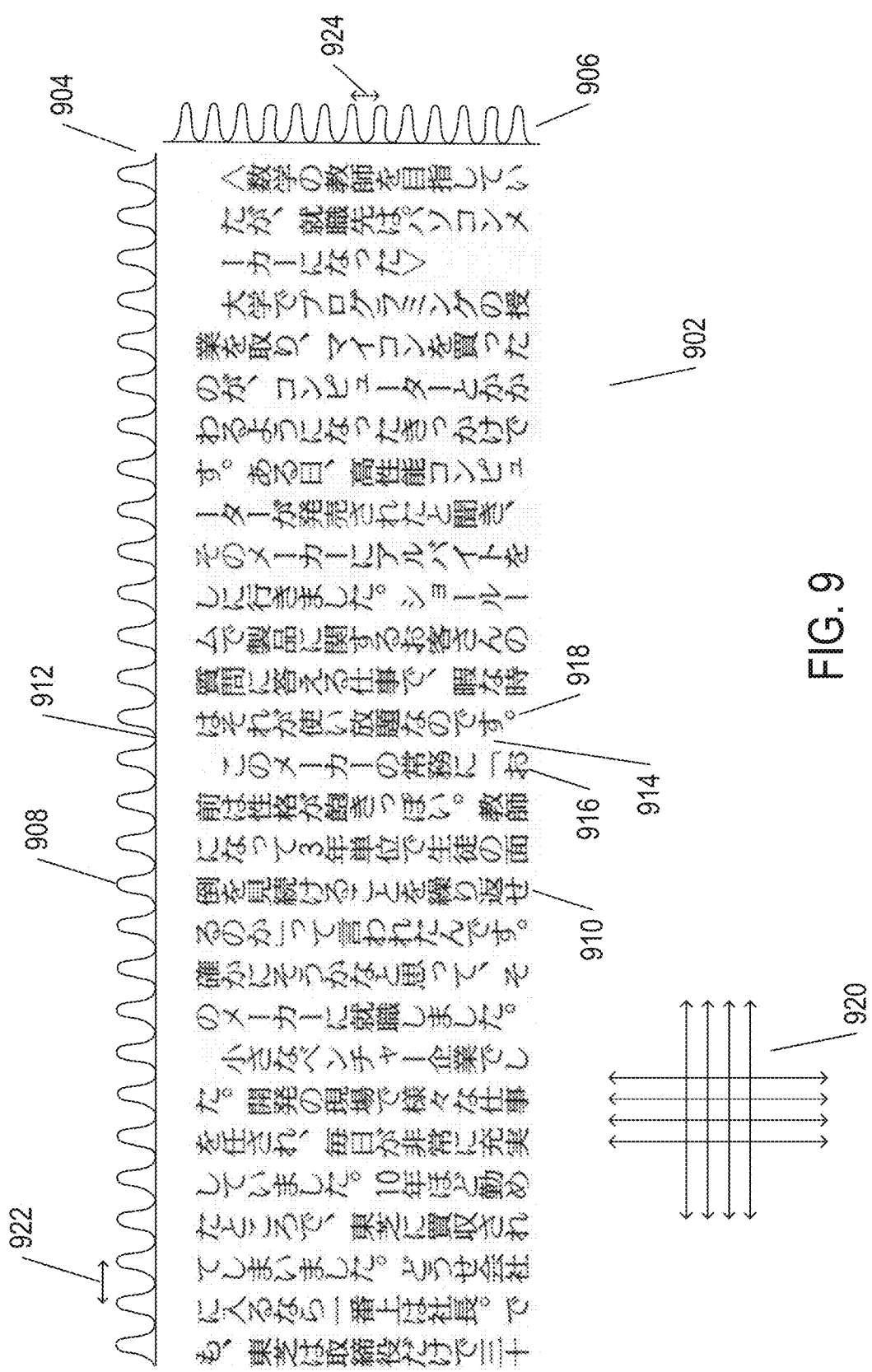
Figure 10:
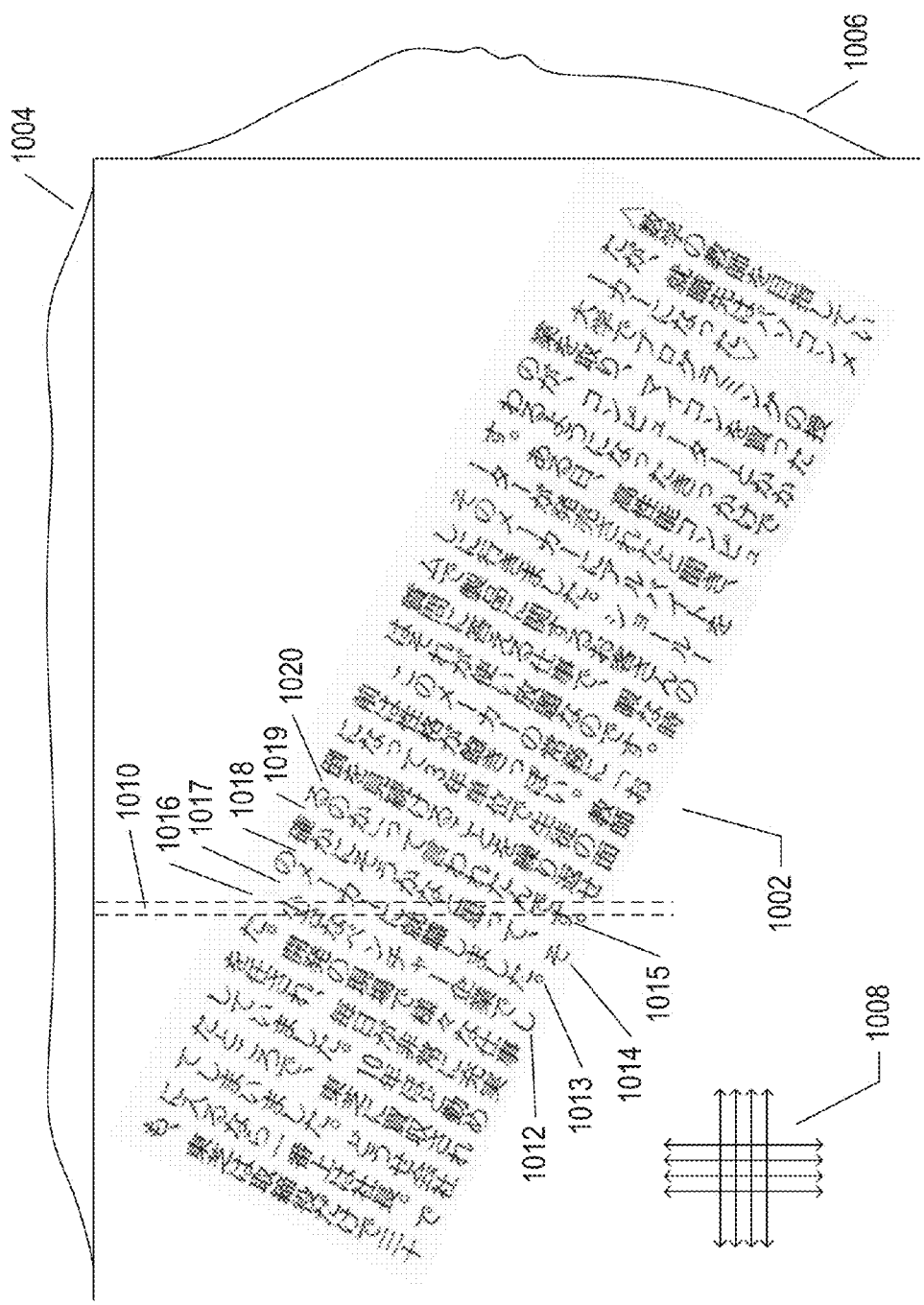

FIGS. 8-10 illustrate one approach to determining an initial orientation for a text-containing region. FIG. 8 shows the generation of a histogram corresponding to one orientation of a text-containing region. In FIG. 8, a text-containing region 802 is vertically oriented. The text-containing region is partitioned into columns demarcated by vertical lines, such as vertical line 804. The number of "1" valued bits in the bitmap corresponding to the text-containing region is counted, in each column, and used to generate a histogram 806 shown above the text-containing region. Columns in the text-containing region containing no portions of characters or, equivalently, only "0"-valued bits, have no corresponding columns in the histogram while columns containing portions of characters are associated with columns in the histogram with heights corresponding to the proportion of bits within the column having value "1." The histogram column heights may alternatively be scaled to reflect the absolute number of "1" valued bits or may alternatively represent a fraction of bits in the column with value "1" or the fraction of the number of "1"-valued bits in a column with respect to the total number of "1"-valued bits in the text-containing region.

FIG. 9 shows histograms generated for columns and rows of a properly oriented text-containing region. In FIG. 9, a text-containing region 902 is aligned with the page boundaries, with rows of text parallel to the top and bottom of the page and columns of text parallel to the sides of the page. The histogram-generation method discussed above with reference to FIG. 8 has been applied to the entire text-containing region 902 to generate histograms for vertical columns within the text-containing region 904 and for horizontal rows within the text-containing region 906. Note that the histograms are shown as continuous curves with the peaks of the curves, such as peak 908 in histogram 904, corresponding to the central portions of text columns and rows, such as text column 910 to which peak 908 corresponds, and valleys, such as valley 912, corresponding to the white-space columns and rows between text columns and text rows, such as the white-space column 914 between text columns 916 and 918. The grid of arrows 920 in FIG. 9 indicates the direction of the vertical and horizontal partitionings used to generate the column histogram 904 and the row histogram 906.

FIG. 10 shows the same text-containing image region shown in FIG. 9 but having a different rotational orientation. The same technique described above with reference to FIG. 9 is applied to the differently oriented text-containing region 1002 to generate the column histogram 1004 and row histogram 1006 using column and row partitions in the direction of the vertical and horizontal arrows 1008. In this case, the histograms are generally featureless, and do not show the regularly spaced peaks and valleys as in the histograms shown in FIG. 9. The reason for this is easily seen by considering the vertical column 1010 shown in FIG. 10 with dashed lines. This vertical column passes through text columns 1012-1015 and white-space columns 1016-1020. Almost every vertical column and horizontal row, other than those at the extreme ends of the histograms, passes through both text and white space, as a result of which each of the vertical columns and horizontal rows generally includes "1" valued bits and "0" valued bits.

Thus, the optical-character-recognition ("OCR") routines can initially orient a text-containing region by rotating the text-containing region through 90° and computing column and row histogram at angular intervals and by then selecting an initial orientation which produces at least one comb-like histogram and generally two comb-like histograms, as shown in FIG. 9, with best peak-to-trough ratios. Note also that the spacing between characters in rows and columns may be inferred from the spacings 922 and 924 between peaks in the column and row histograms.

There are many different alternative possible methods for determining an initial orientation of a text-containing region. The method discussed above with reference to FIGS. 8-10 is provided as an example of the types of approaches that may be employed. In many cases, the spacings between characters may not be as regular as those shown in the example used in FIGS. 9-10, as a result of which different techniques may be used to determine character boundaries. In one such approach, vertical white-space columns are identified within a horizontal row of text characters and the distances between such columns are tabulated in a histogram. Character boundaries are then determined as a traversal path through the row from one white-space column to another with path elements most closely corresponding to expected inter-white-space-column distance intervals based on the histogram.

Figure 11A:
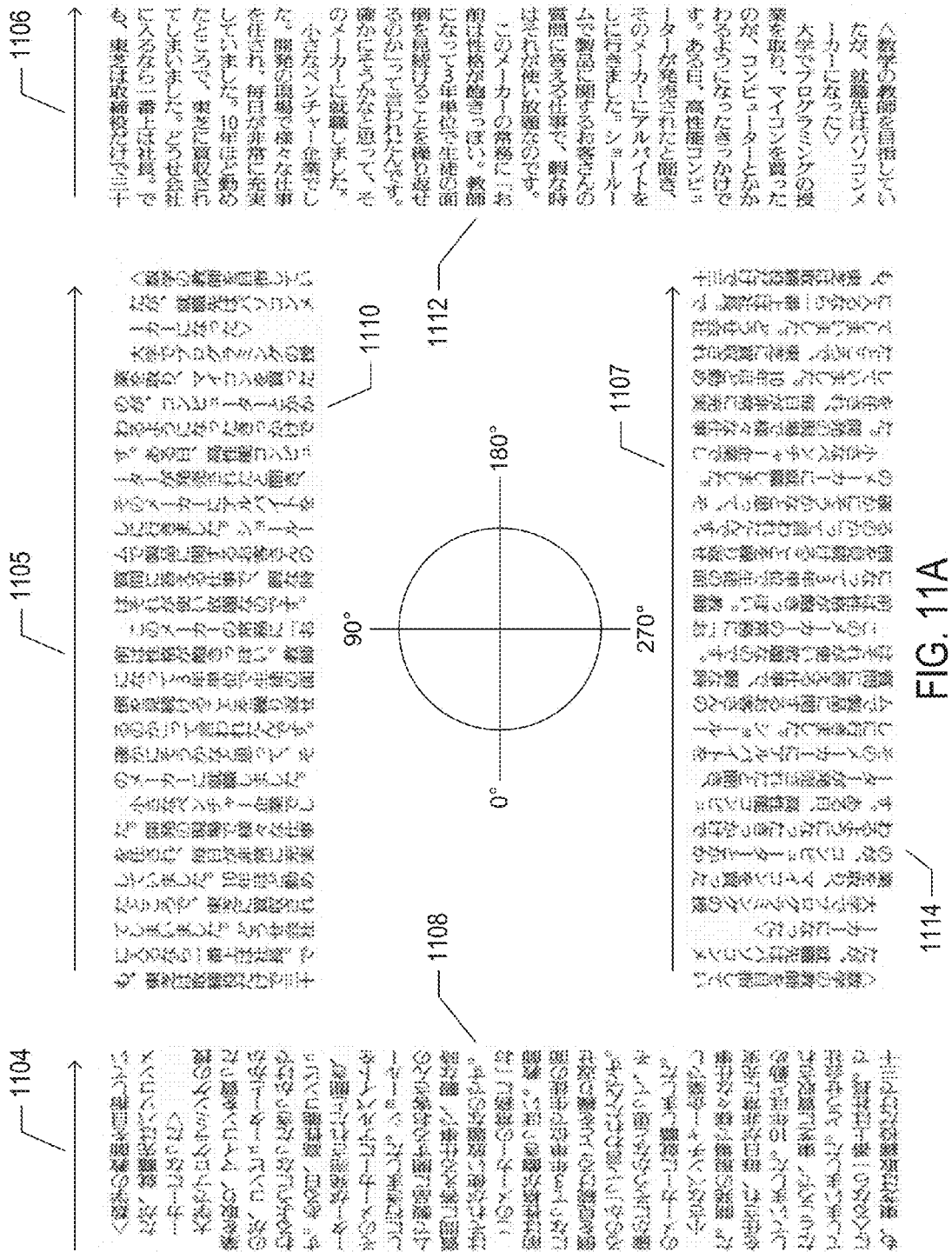

Once an initial orientation has been established, there are still at least 16 different possible sense orientations for the text-containing region. FIGS. 11A-D illustrate 16 different possible sense orientations. FIG. 11A shows four of the 16 different possible sense orientations of the example text-containing region used in FIGS. 9 and 10. In these sense orientations, the text characters are assumed to be read left to right in horizontal rows, as indicated by arrows 1104-1107. Assuming an initial orientation of the text-containing region shown in the left-hand side of FIG. 11A 1108, which is arbitrarily assigned the rotational value of 0°, the text-containing region may be rotated by 90° to produce a second sense orientation 1110, by 180° to produce a third sense orientation 1112, and by 270° to produce a fourth sense orientation 1114.

Figure 11B:
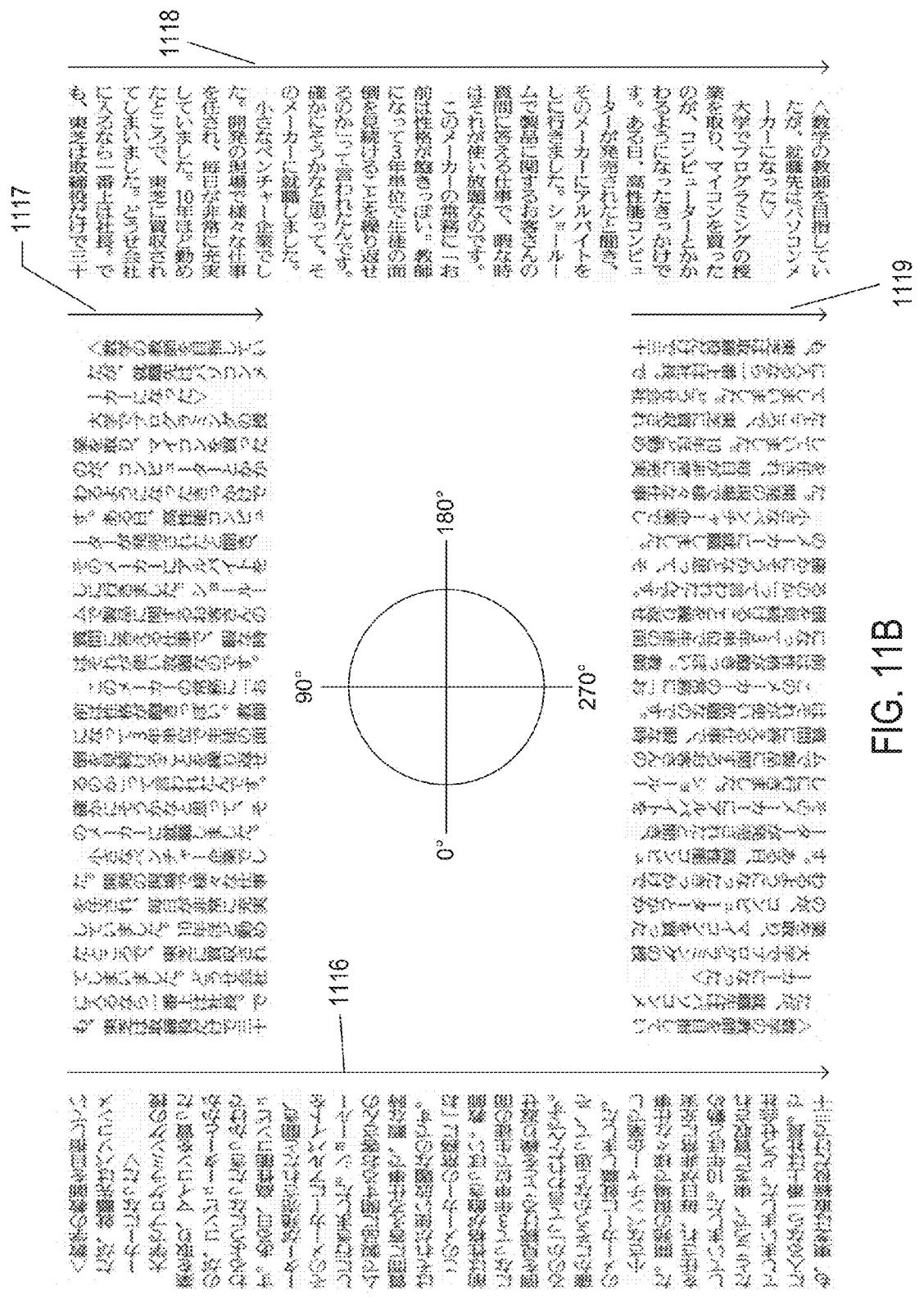
Figure 11C:
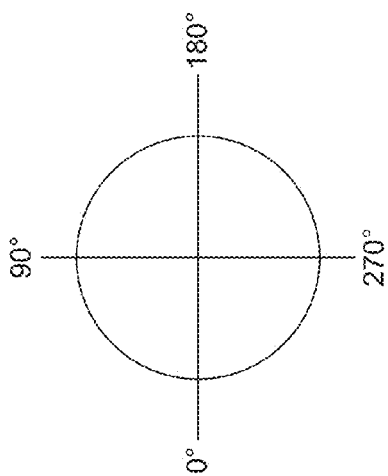
Figure 11D:
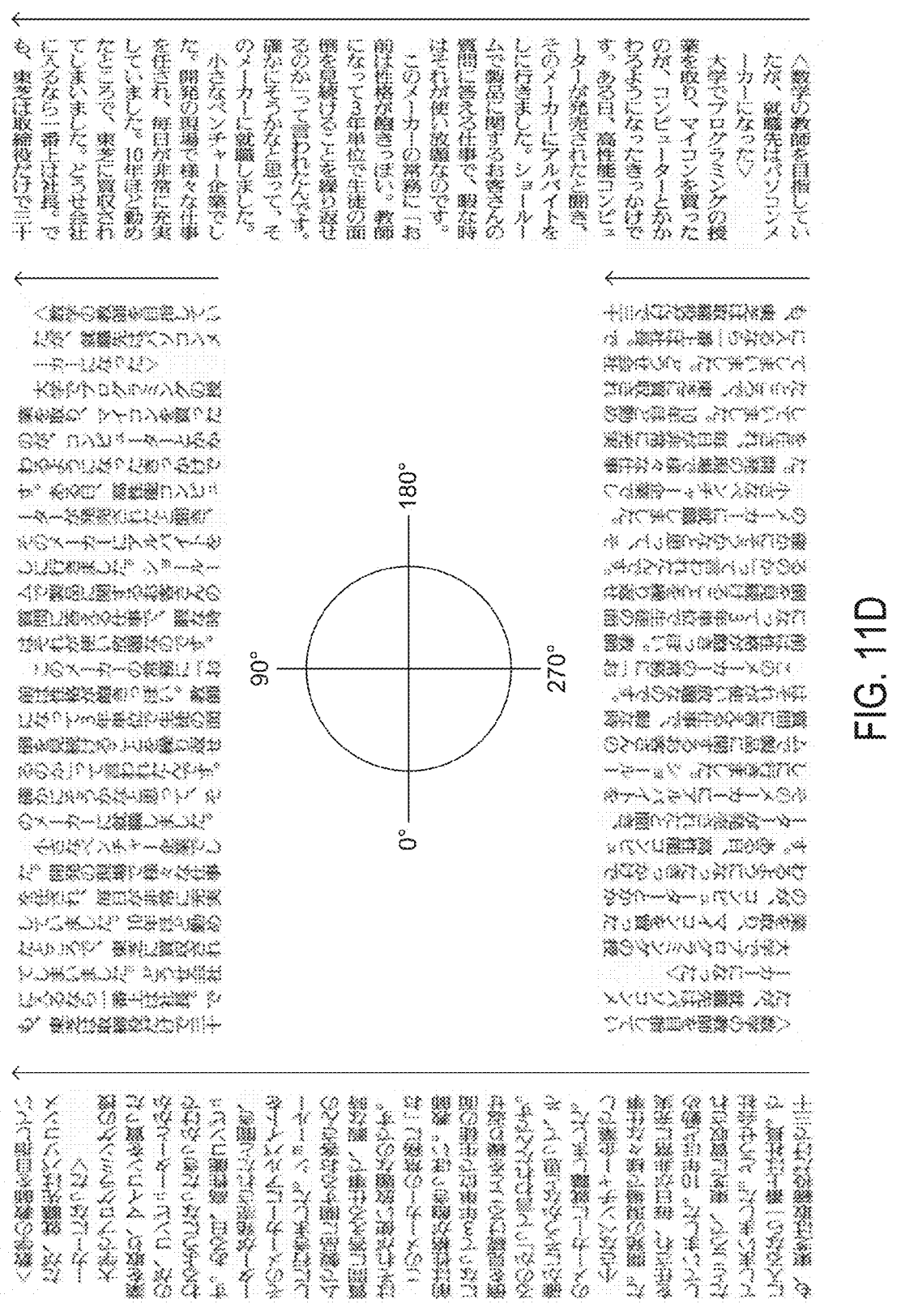

FIG. 11B shows four more possible sense orientations. In this case, the text is assumed to be read vertically downwards, as indicated by arrows 1116-1119. As with FIG. 11A, the text-containing region may be rotated by 0°, 90°, 180°, and 270° to produce the four additional sense orientations. FIGS. 11C-D show eight additional sense orientations, with the sense orientations shown in FIG. 11C assuming the text to be read from right to left horizontally and the sense orientations shown in FIG. 11D assuming the text to be read vertically from top to bottom.

Figure 12:
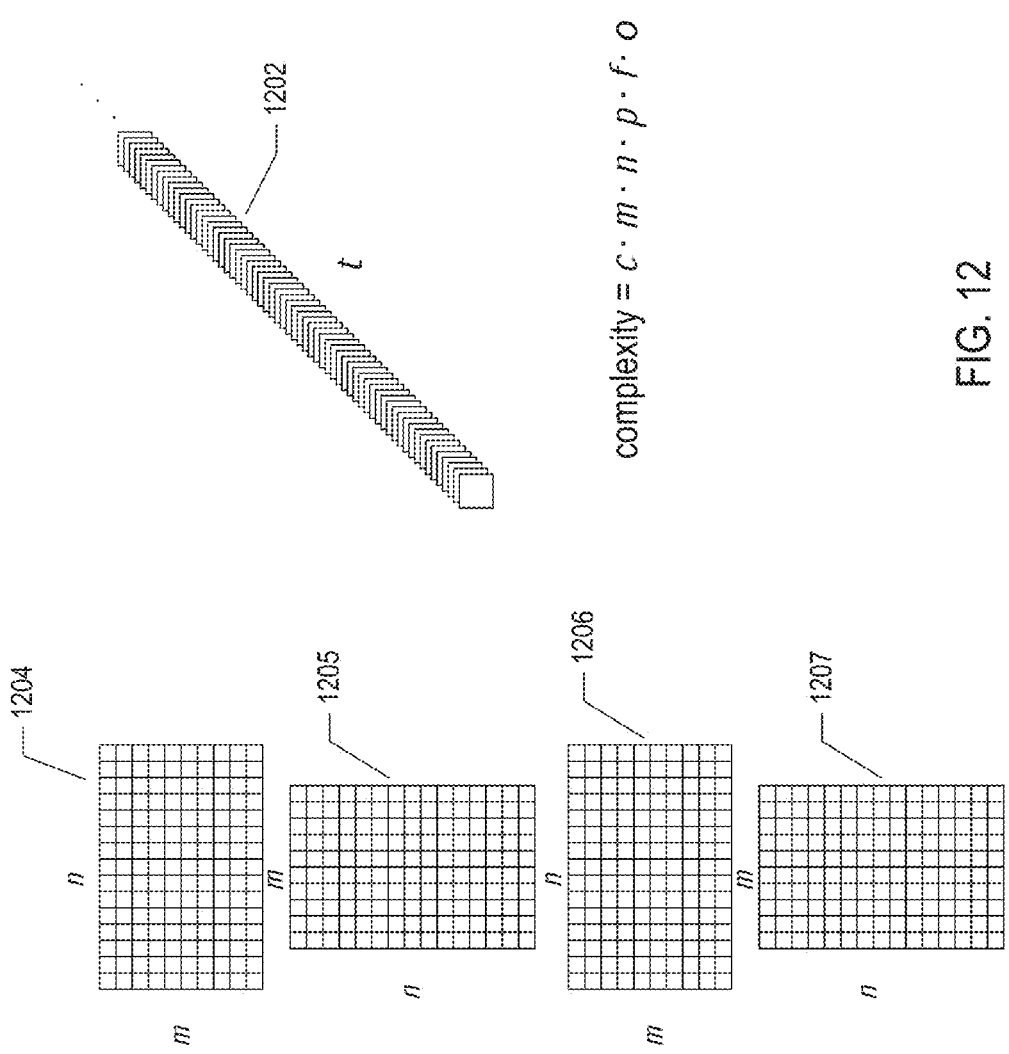
FIG. 12 illustrates a challenge with respect to recognition of text characters of various types of character-based languages or languages in which text is not written as simple strings of alphabetic characters.

FIG. 12 illustrates a challenge with respect to recognition of text characters of various types of character-based languages or languages in which text is not written as simple strings of alphabetic characters. When the text comprises characters of character-based languages, an OCR routine may need to attempt to match each of 40,000 or more character patterns 1202 to each character image in each possible orientation of a text-containing region. Even when, by various considerations and initial analyses, the number of possible sense orientations can be decreased from the 16 possible sense orientations shown in FIGS. 11A-D to just four possible sense orientations 1204-1207, the computational complexity of the task of determining the actual sense orientation is high. The computational complexity can be expressed as:

$$\text{computational complexity} = c \cdot m \cdot n \cdot p \cdot f \cdot o$$

where c is the computational complexity involved in matching a single character pattern with the image of a character;
m is the number of rows in the initial 0° orientation;
n is the number of columns in the initial 0° orientation;
p is the number of character patterns for the language;
f is the fraction of character images in the text-containing region that needs to be evaluated in order to successively determine the sense orientation of the text-containing region; and
o is the number of possible sense orientations.

The computational complexity is dominated by the term p which, as mentioned above, can be as large as 40,000 or more for character-based languages. In one approach, the OCR routine may attempt pattern matching on each possible sense orientation for some fraction f of character images and then determine which of the possible orientations produces the greatest fraction of high-probability pattern matches. Because of the large number of character patterns and the difficulty of the pattern-matching task, it is likely that a substantial fraction f of the character images in the text-containing region may need to be pattern-matched in order to reliably determine the sense orientation of the text-containing region.

The current application is directed to methods and systems for determining the sense orientation of text-containing regions in a scanned-document image that features significantly less computational complexity than the method discussed above with reference to FIG. 12. For text in languages that use simple alphabetic characters and in which words, phrases, and sentences are written in a predictable direction as strings of alphabetic characters, such as English, French, Russian, German, and other alphabet-based languages, the computational complexity of the above-described orientation method is not overwhelming, since both the computational complexity of symbol recognition, c, and the number of patterns that need to be recognized, p, are both of modest magnitudes and well bounded. However, in character-based languages, such as Chinese, both c and p, and in particular p, are of sufficiently large magnitude to render the approach illustrated in FIG. 12 practically intractable. Note that, although Korean is an alphabetic language, Korean is written as syllables using two-dimensional combinations of alphabetic characters that have the appearance of characters, and is thus an additional example of a language, like Japanese and Chinese, for which the currently disclosed orientation methods are particularly applicable. The methods and systems to which the current application is directed lower the computational complexity of text-containing-region orientation by decreasing both the magnitude of p and c for character-based languages.

Figure 13A:
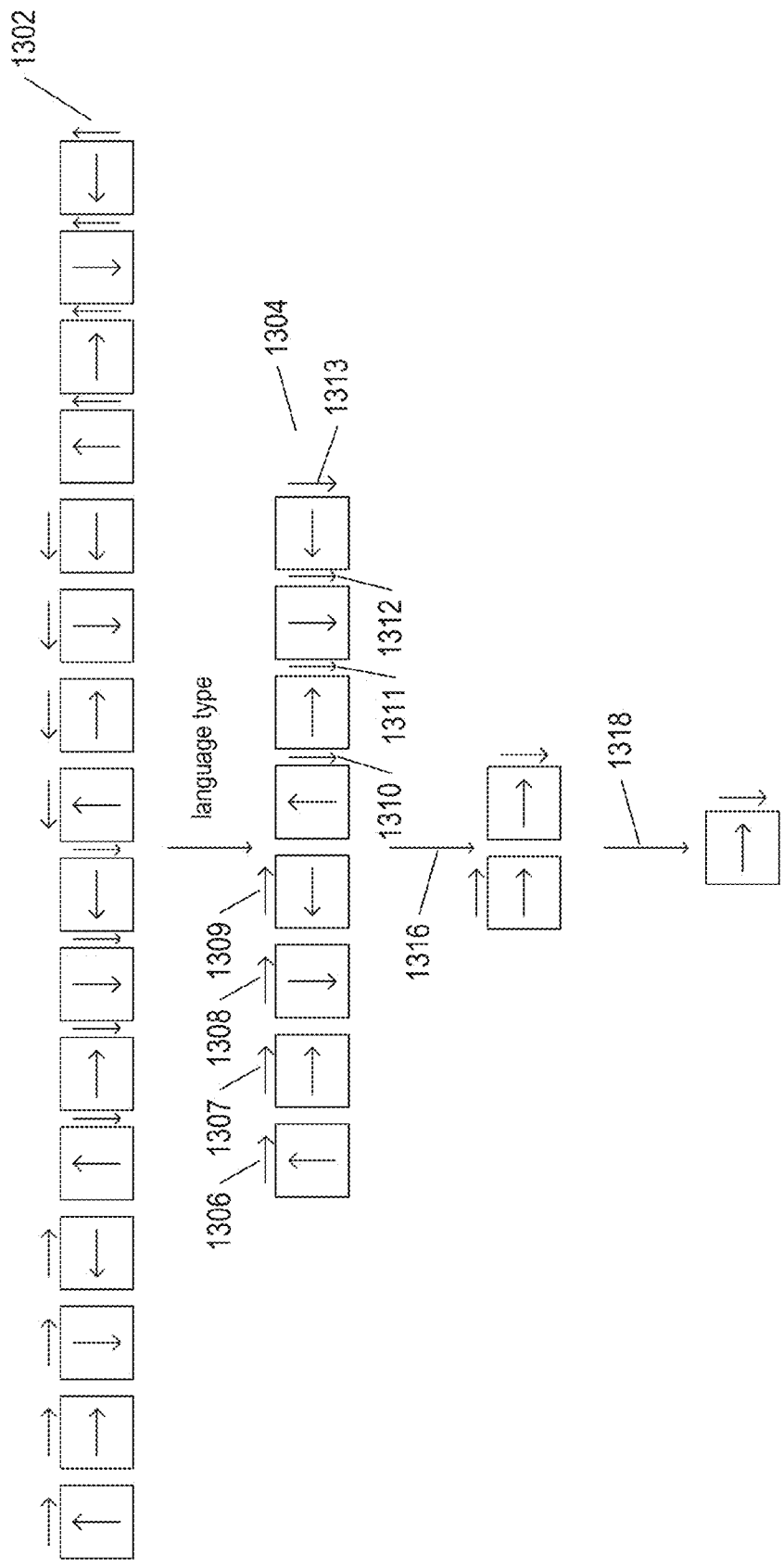
FIGS. 13A-B illustrate general approaches of certain implementations of the currently disclosed methods and systems for text-containing-region orientation.
Figure 13B:
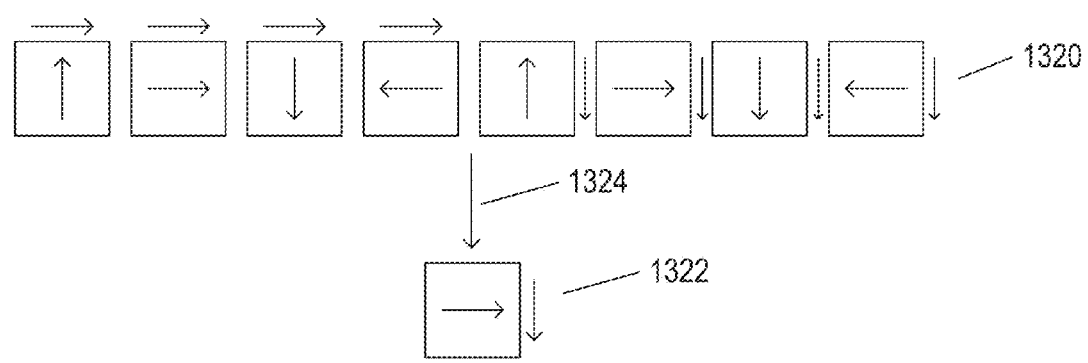

FIGS. 13A-B illustrate general approaches of certain implementations of the currently disclosed methods and systems for text-containing-region orientation. FIG. 13A illustrates a very general approach for text-containing-region orientation. As discussed above with reference to FIGS. 11A-D, there are initially 16 possible sense orientations, shown in top row 1302, for a text-containing region following initial orientation. In general, once the language type of the text is determined, the number of possible sense orientations decreases appreciably, as represented by the second row 1304 of possible sense orientations shown in FIG. 13A. For example, when the text comprises Chinese characters, language conventions specify that the text is either written in left-to-right horizontal rows 1306-1309 or in top-to-bottom vertical columns, 1310-1313. In general, when even a family of languages to which the text belongs is identified, rather than a specific language, a significant decrease in the possible sense orientations is obtained. In a next step represented by vertical arrow 1316, and a step to which the current application is directed, the number of possible sense orientations can generally be reduced to no more than two even for character-based languages, such as Chinese, at relatively low computational overhead. Once the number of possible sense orientations is reduced to two, it is computationally straightforward to determine a final, correct orientation, in a step represented by arrow 1318. The final-sense-orientation determination can be carried out in many ways. In one approach, additional characteristics of the text image may be considered. As one example, it is often the case that certain pairs of characters occur in adjacent character locations or in character locations separated by only one or a few intervening characters, at relatively high frequency. Recognition of the occurrence of such pairs of characters predominantly in one of two possible sense orientations provides strong evidence that the sense orientation featuring the occurrence of high-probability pairs of adjacent characters is the proper sense orientation for the text-containing scanned-document-image region.

FIG. 13B shows an alternative approach for text-containing-region orientation. In many cases, and as is assumed in subsequent portions of this discussion, the language in which text is written is known in advance. As a result, there are generally only 8 possible sense orientations 1320, in the case of non-alphabetic languages, and only four possible sense orientations in many alphabetic languages. Furthermore, using the text-containing-region orientation methods and systems disclosed below, a final sense orientation 1322 is obtained without undertaking an additional step, in essentially a single sense-orientation-determination step 1324. The following discussion is directed to step 1316 in FIG. 13A and step 1322 in FIG. 13B, in which currently disclosed methods and systems can choose at most two possible sense orientations or, alternatively, a single sense orientation, from among a larger number of possible sense orientations in a computationally efficient manner.

Figure 14:
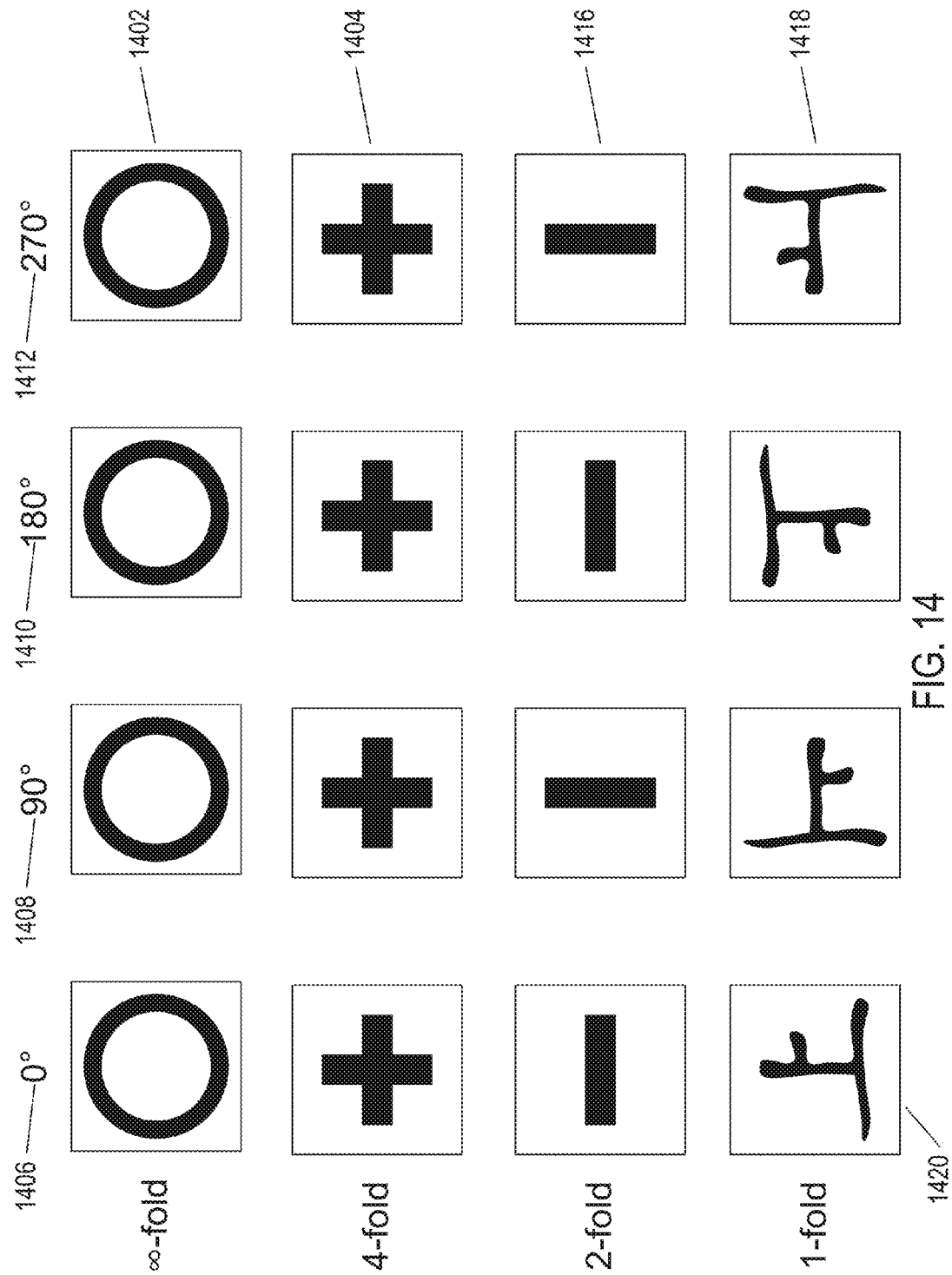
FIG. 14 illustrates rotational symmetries of characters or symbols.

FIG. 14 illustrates rotational symmetries of characters or symbols. In the following discussion, the rotational symmetries of characters are considered. There are an infinite number of different possible rotational symmetries. An example of a text character with the highest rotational symmetry is the alphabet character "o." As shown in the top row 1402 of FIG. 14, the letter "o" has the same appearance regardless of by what number of degrees the character is rotated about a central rotational axis perpendicular to the plane of the character. This type of rotational axis is referred to as an ∞-fold rotational axis. The symbol "+" has four-fold rotational symmetry, as shown in row 1404 in FIG. 14. The appearance of this symbol is illustrated for rotations about a perpendicular, central rotational axis of 0° (1406 in FIG. 14), 90° (1408 in FIG. 14), 180° (1410 in FIG. 14), and 270° (1412 in FIG. 14). Rotations by a number of degrees other than 0°, 90°, 180°, and 270° would leave the symbol in a rotational orientation that would render the symbol's appearance different than that of the familiar symbol "+," with a vertical member crossing a horizontal member. The symbol "−" has two-fold rotational symmetry, as illustrated in row 1416 of FIG. 14. This symbol can be rotated by 180° about a central, perpendicular rotational axis without changing the symbol's appearance. In the final row 1418 of FIG. 14, a Japanese symbol with a one-fold rotational axis is shown. For this symbol, there is no orientation, other than the orientation at 0° 1420, at which the symbol has an appearance identical to its appearance at 0° orientation. The one-fold rotational symmetry is the lowest rotational symmetry that a symbol can possess. Symbols with one-fold rotational symmetries are referred to as "asymmetric symbols," or "asymmetric characters." Asymmetric characters are desirable candidates for orientation-marker characters that can be used to efficiently determine the sense orientation of a text-containing region according to the methods and systems disclosed in the current application.

Figure 15:
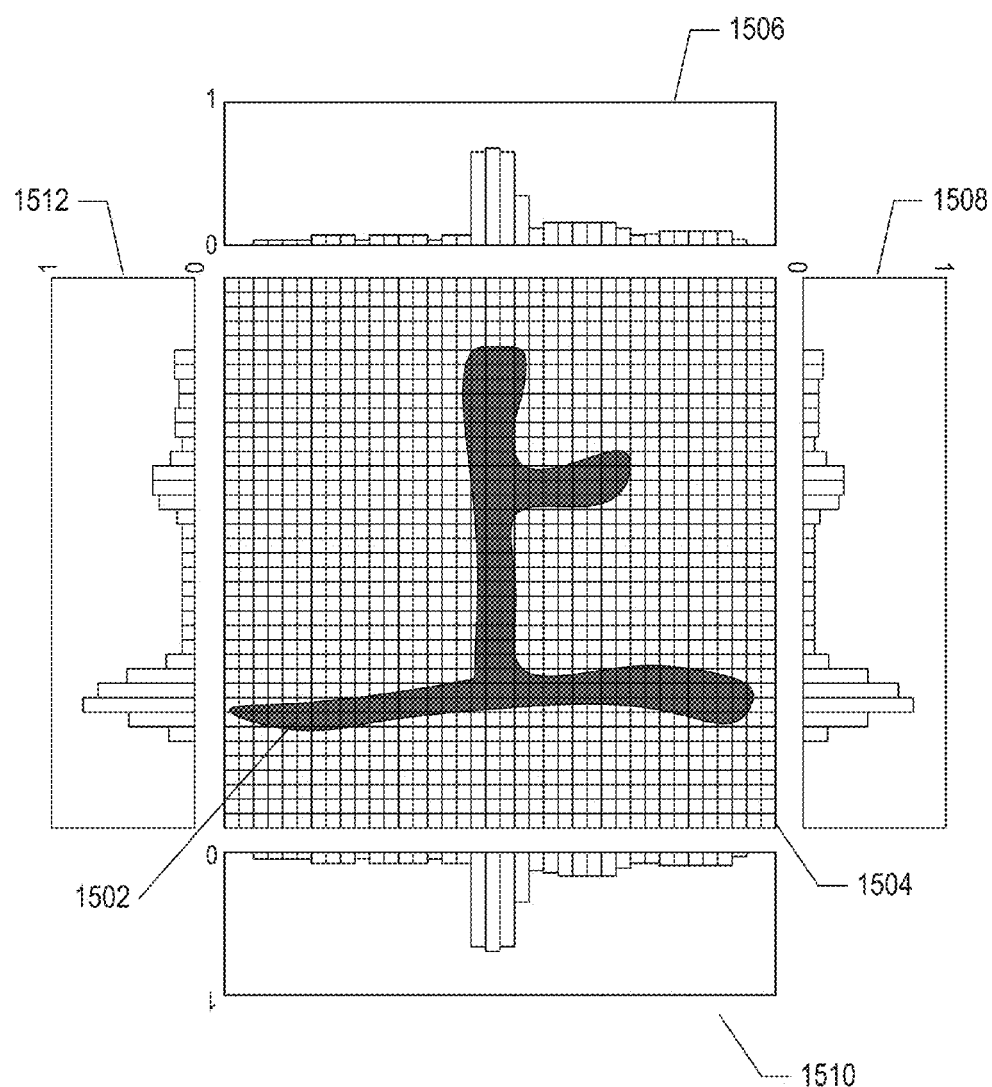
FIGS. 15-17 illustrate one computational approach to determining the orientation of an asymmetric orientation-marker character.
Figure 16:
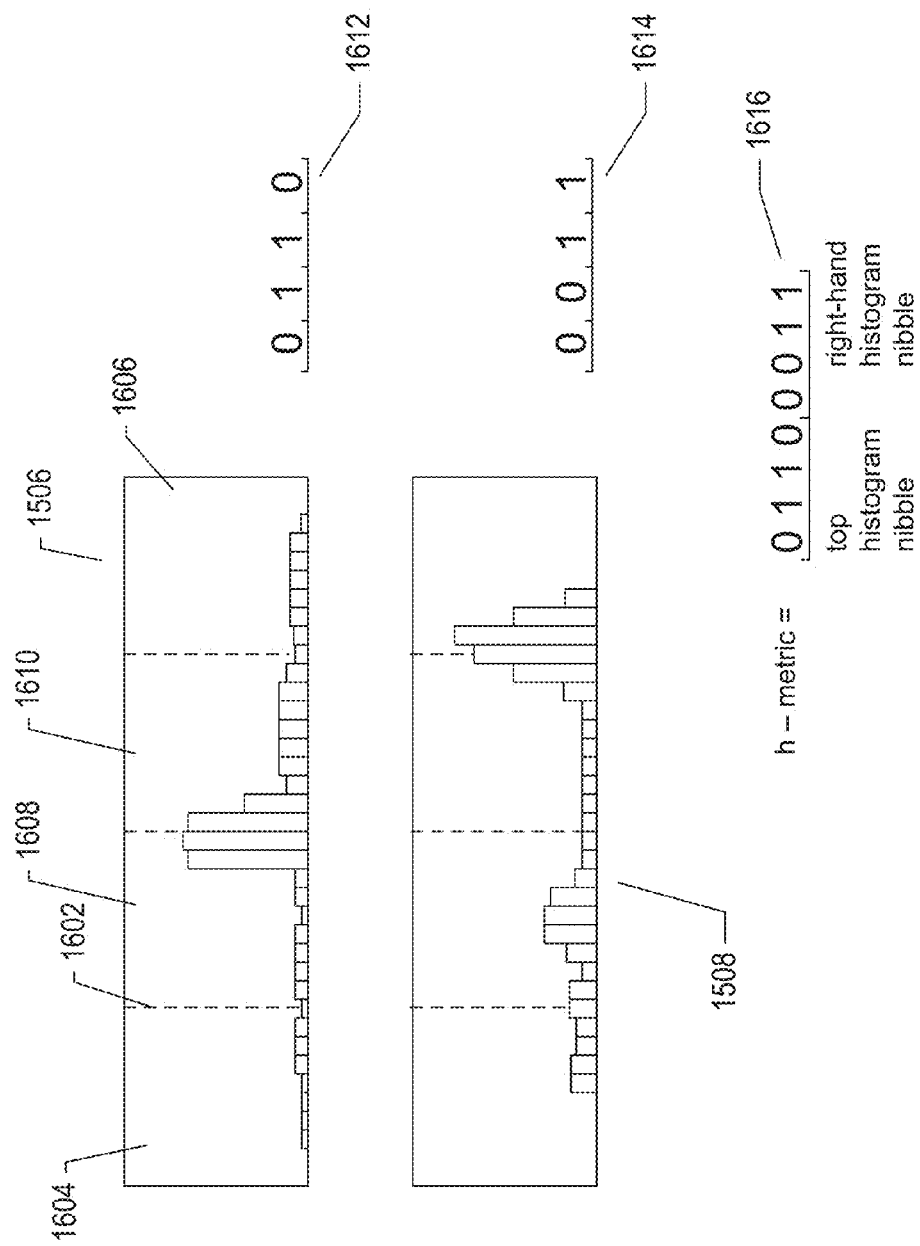
Figure 17:
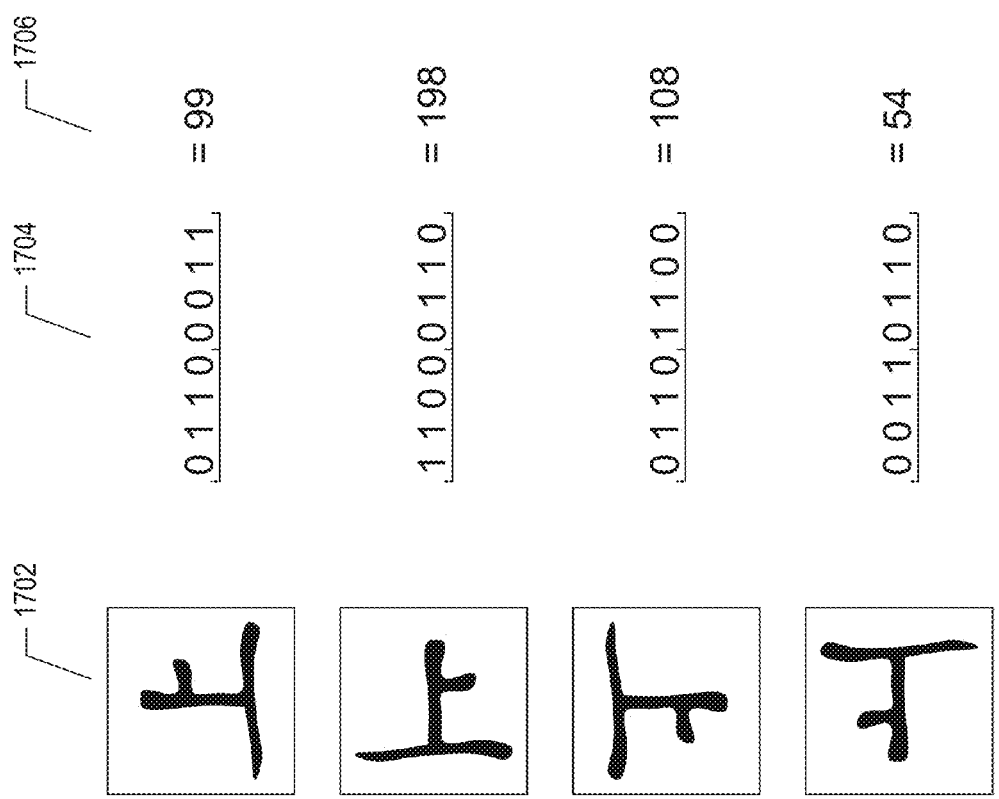

FIGS. 15-17 illustrate one computational approach to determining the orientation of an asymmetric orientation-marker character. In FIG. 15, the Japanese character 1502 used as an example in the lowest row 1418 of FIG. 14 is shown superimposed over a rectilinear grid 1504. As in region 508 of FIG. 5, each grid element or cell represents a matrix of pixel elements, as a result of which the character edges appear smooth. At higher magnification, as in region 512 of FIG. 5, the character edges would appear jagged. As discussed above, these pixels are assigned either of two bit values "0" and "1," to indicate whether or not the pixel corresponds to a portion of the background or to a portion of the symbol, respectively. The fraction of pixels within each column of grid elements is plotted in histogram 1506, shown above the rectilinear grid 1504. This histogram represents the horizontal spatial distribution of character pixels within the rectilinear grid, which represents a single-character-containing portion of a scanned-document image. Similarly, histogram 1508 shows the spatial distribution of symbol pixels in a vertical direction. Histogram 1510 is related to histogram 1506 by mirror symmetry, and histogram 1512 is related to histogram 1508 also by mirror symmetry. These histograms are signatures or fingerprints for asymmetric-character orientation.

FIG. 16 illustrates a numeric metric that can be computed based on two of the four histograms shown in FIG. 15. In this figure, an orientation metric, referred to as the "histogram metric" or "h-metric," is computed from the top histogram and the right-hand histogram, 1506 and 1508, computed for a particular symbol in a particular orientation. Each histogram is partitioned into four regions by dashed vertical lines, such as dashed vertical line 1602. Each region is assigned a value "0" or "1" depending on whether or not a histogram column within the region exceeds a threshold value, such as 0.5. These bit values are ordered in the same order as the partitions. Thus, for example, for histogram 1506, there is no column in partitions 1604 and 1606 that exceeds the threshold value or height 0.5 while, in partitions 1608 and 1610, there is at least one column of the histogram that exceeds the threshold value or height 0.5. Thus, the bit values assigned to the partitions generate the four-bit nibble "0110" 1612. A similar computation for the right-hand histogram 1508 generates the four-bit nibble "0011" 1614. These two four-bit nibbles can be concatenated to generate an eight-bit h-metric 1616.

FIG. 17 illustrates the h-metrics generated for each of the four orientations for the asymmetric character shown in the lower row of FIG. 14. Each orientation of the character is shown in column 1702, with the corresponding eight-bit h-metric shown in column 1704 and the equivalent decimal number shown in column 1706. Clearly, generation of h-metrics for each of the possible orientations of a character allows the orientation of a character in a scanned-document image to be easily determined. This particular character is a good candidate character for serving as an orientation-marker character because the Hamming distance between any pair of h-metrics is at least two. The Hamming distance is the number of bit inversions necessary to convert a first bit string or bit field into a second bit string or bit field. The Hamming distance can be determined by computing the bitwise exclusive OR ("XOR") of two equal-length bit strings and then counting the number of bits with the value "1." The greater the minimum Hamming distance between any pair of h-metrics computed for the different orientations of an orientation-marker character, the better robustness and reliability obtained by determining the orientation of the image of a character based on h-metrics.

It should be noted that there are many different possible approaches to computationally determining the orientation of an orientation-marker character, such as that shown in FIG. 15. As one example, the histograms may be partitioned into a different, fixed number of partitions leading to an h-metric bit string of fewer or greater than eight bits. As another example, rather than choosing values "1" and "0" for the partitions, as described above, different criteria may be used, such as more than a threshold number of columns in the partition having a height greater than a threshold height. However, additional types of h-metrics may be employed. One example would be an h-metric based on the radial distribution of "1"-valued pixels within the rectilinear grid. The methods and systems to which the current application is directed may employ any of these various different types of h-metrics or combinations of different types of h-metrics.

Figure 18:
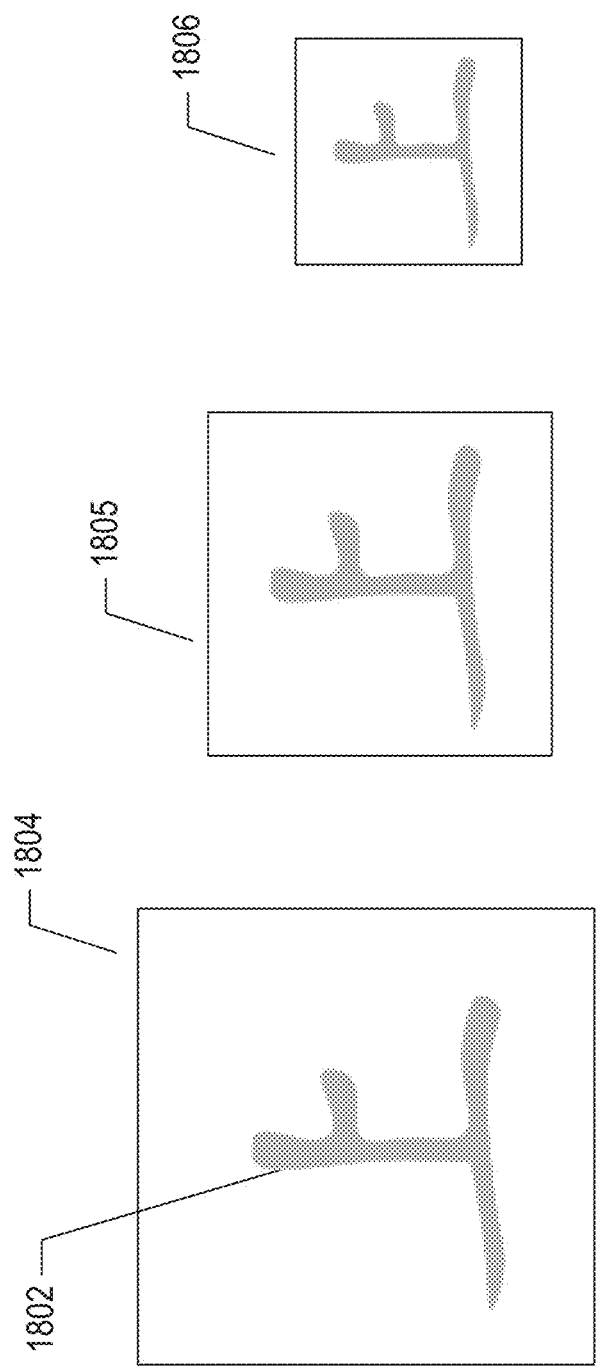
FIGS. 18-19B illustrate another type of metric that can be employed to recognize an orientation-marker character as well as to determine the orientation of the orientation-marker character in a scanned-document image.
Figure 19A:
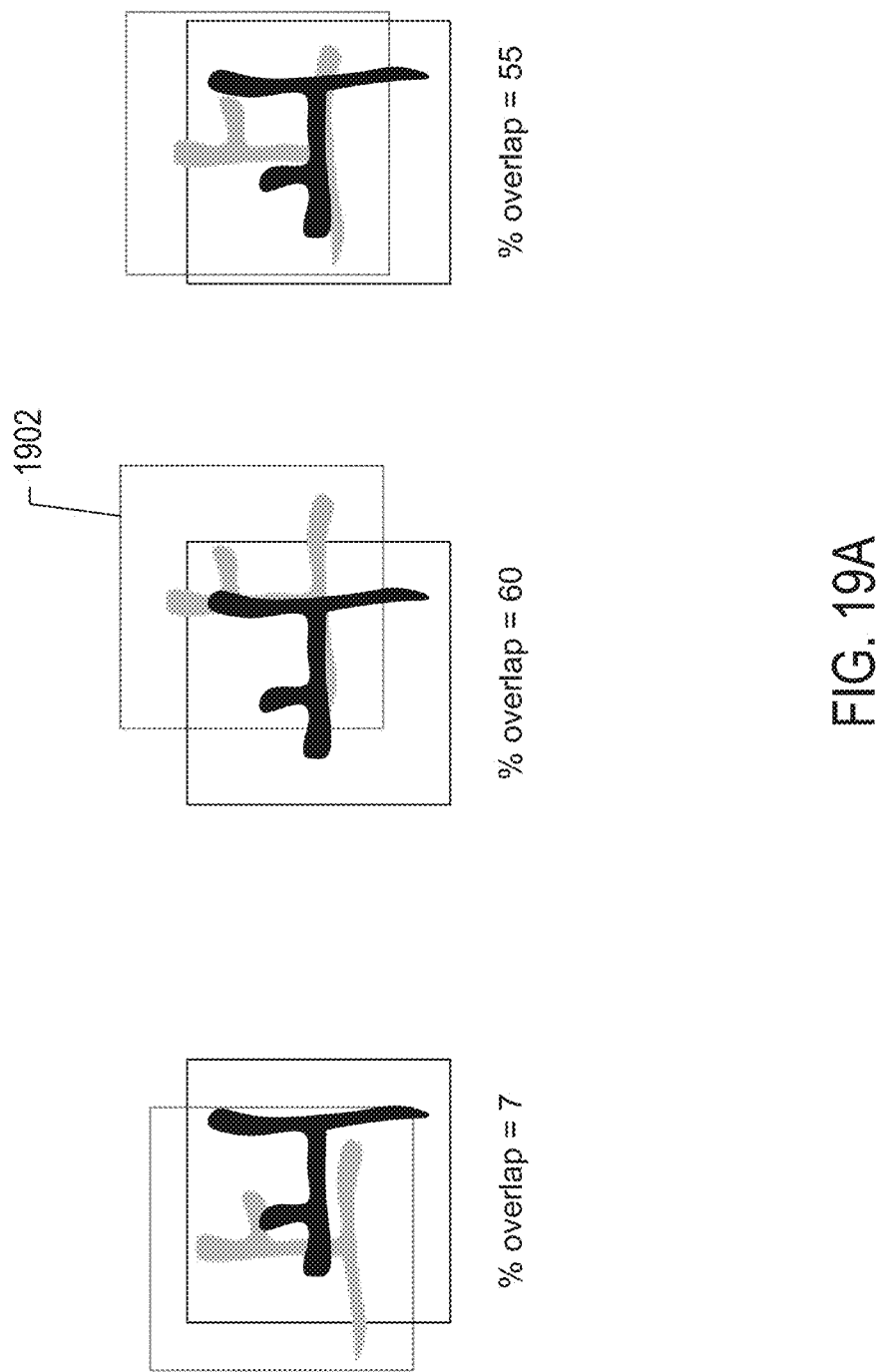
Figure 19B:
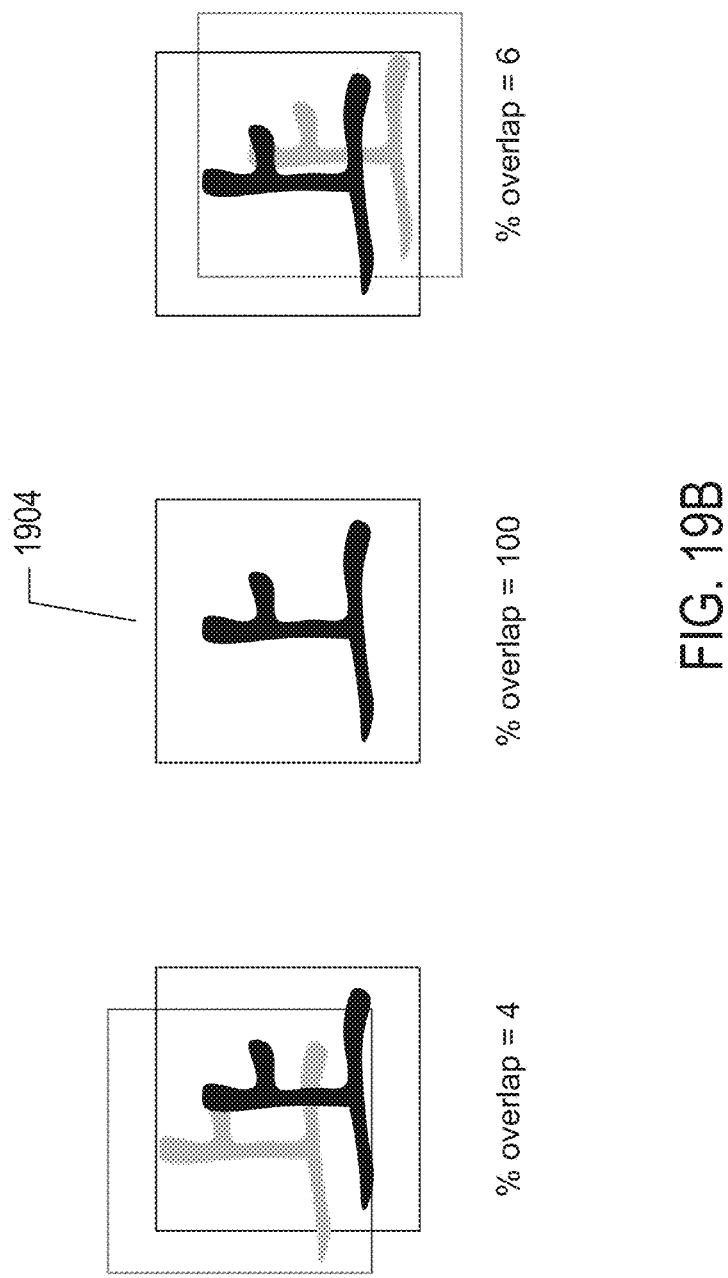

FIGS. 18-19B illustrate another type of metric that can be employed to recognize an orientation-marker character as well as to determine the orientation of the orientation-marker character in a scanned-document image. FIG. 18 shows a representation of an orientation-marker character 1802 at three different scales 1804-1806. In order to recognize a particular orientation-marker symbol as well as the orientation of the orientation-marker symbol, the representation may be superimposed over a single-character-containing region of the scanned-document image and translated vertically and horizontally in order to compute the percentage overlap of the representation of the character with symbol pixels in the single-character-containing region of the scanned-document image at different positions. An overlap metric, or o-metric, may be obtained as the maximum overlap of the representation with symbol pixels in the underlying region of the scanned-document image for all of the possible positions. For example, in FIG. 19A, several different positions of the representation with respect to the underlying region of the scanned-document image are shown, with position 1902 providing the maximum overlap of 60 percent. When the same process is carried out for a region of a scanned-document image which contains the same character with the same orientation as represented by the representation, then a maximum overlap of 100 percent 1904 is obtained. Thus, 1 minus the maximum overlap, expressed as a fraction between 0 and 1, is an additional orientation and character-recognition metric that can be used alone or in combination with the above-described h-metric to both recognize an orientation-marker character within a scanned-document image and determine the orientation of the orientation-marker character. The o-metric value theoretically falls within the range [0, 1], with 0 indicating perfect overlap and 1 representing no overlap although, in practice, values above 0.95 are not generally obtained. As with the h-metric, there are many possible alternative approaches to generating an o-metric, such as that discussed above with reference to FIGS. 18-19A. For example, the o-metric may be alternatively computed as the difference between the maximum overlap and the average observed overlap over all positions of the character representation considered. Other types of metrics may include the percentage of symbol pixels within a single-character-containing region of a scanned-document image, or the percentage of symbol pixels within subregions of a single-character-containing region of a scanned-document image. In many implementations, tens to hundreds of different metrics may be used to recognize a character and the character's orientation.

Figure 20:
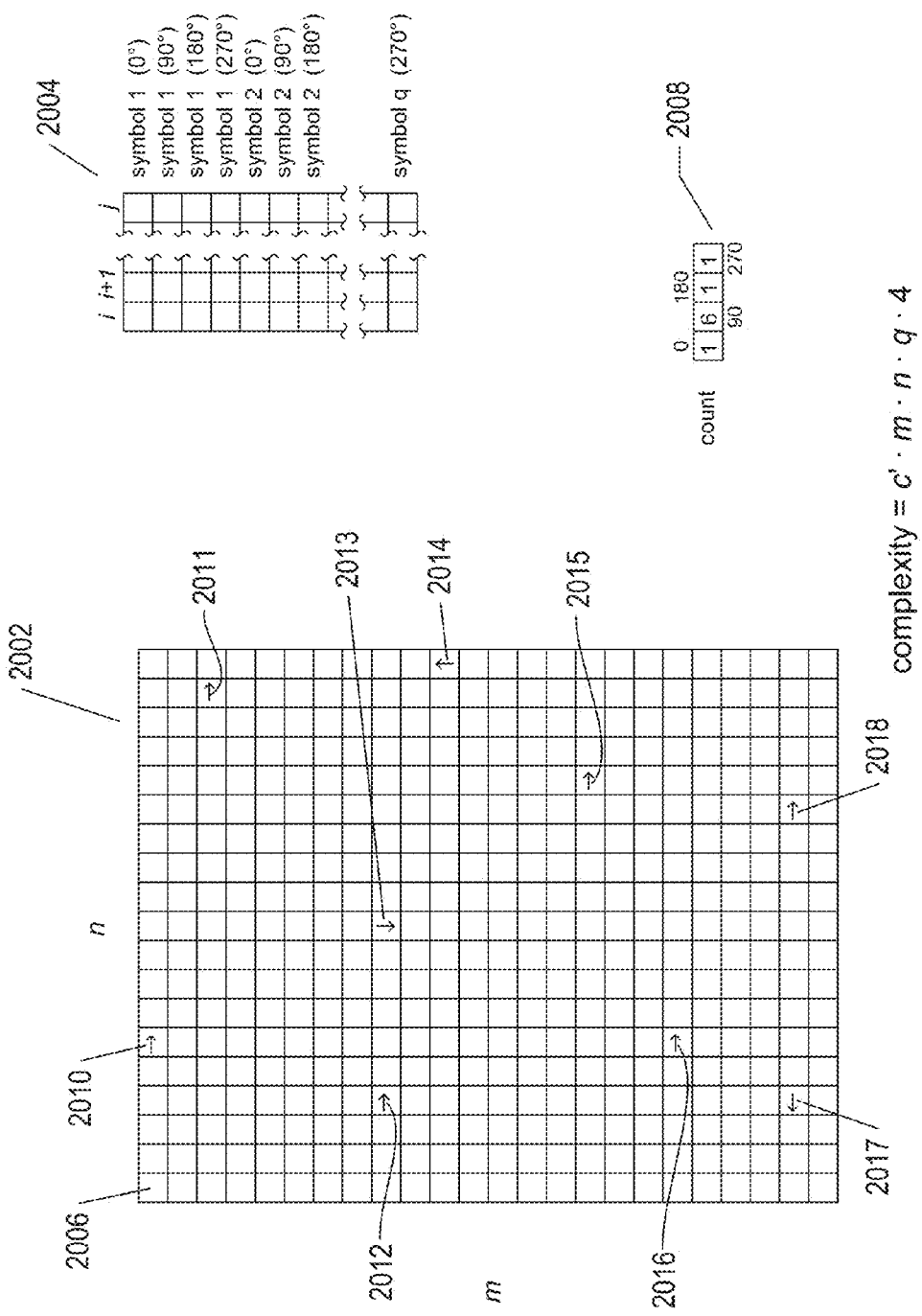
FIG. 20 illustrates aspects of the orientation-marker-character-based text-containing-region-orientation methods and systems to which the current application is directed.

FIG. 20 illustrates aspects of the orientation-marker-character-based text-containing-region-orientation methods and systems to which the current application is directed. FIG. 20 uses the same illustration conventions previously used in FIG. 12. In FIG. 20, the rectilinear grid 2002 with m rows and n columns represents an initially oriented text-containing region of a scanned-document image. The small grid 2004 represents data associated with a relatively small number of orientation-marker symbols or characters for a particular language or language type. In this example, there are q orientation-marker symbols, each represented in four different orientations. There are therefore q·4 different orientation-marker patterns, each associated with j different computed metric values, such as h-metric and o-metric values. In addition, each orientation-marker pattern includes, or is associated with, a representation of the character, not explicitly shown in FIG. 20. In order to determine the sense orientation of the text-containing region 2002, one or more OCR routines attempts to match each symbol-containing subregion, represented in FIG. 20 by cells, such as cell 2006, to each orientation-marker pattern. Matching involves computing the sum of weighted distances between pairs of metric values, one metric value in each pair obtained from the computed metric values for the orientation-marker pattern and the other metric computed from the symbol-containing subregion. Various distance functions may used, as appropriate for the particular metric, including the Hamming distance, absolute value of the difference between metric values, the squared difference between metric values, and other distance functions. A match occurs when the computed sum of weighted distances between pairs of metric values is less than a threshold value, in one implementation. The orientation of the best matching orientation-marker pattern is recorded in the array count 2008 for each symbol-containing subregion, when at least one orientation-marker pattern matches the symbol-containing subregion. At the end of this method, an array of orientation counts 2008 is obtained. For example, as shown in FIG. 20, the OCR routines identified nine orientation-marker patterns 2011-2018 in the text-containing region 2002 with orientations indicated by the small arrows inscribed in the subregions. Array 2008 contains the counts for the number of each orientation observed. Because a substantial majority of the identified orientation-marker characters had the 90° orientation, the OCR routines infer that the orientation for the text-containing region is 90° or, equivalently, that the text-containing region should be rotated by 90° to provide one or two sense orientations for the text-containing region. As discussed above with reference to FIGS. 13A-B, the OCR routines may, in certain cases, apply additional considerations to select a final sense orientation from two possible sense orientations.

As shown in FIG. 20, the computational complexity for the orientation-marker-pattern-based sense orientation method illustrated in FIG. 20 can be expressed as:

computational complexity=$c' \cdot m \cdot n \cdot q \cdot 4$ where $c'$ is the computational complexity for matching an orientation-marker-symbol to a symbol image;
m is the number of rows in text-containing region;
n is the number of columns in the text-containing region; and
$q \cdot 4$ is the number of orientation-marker patterns that are matched.

The ratio of the computational complexity of the method discussed in FIG. 20 to the computational complexity of the method illustrated in FIG. 12 is therefore:

$$\frac{c' \cdot 4 \cdot q}{c \cdot o \cdot p}.$$

In the case, as one example, in which 100 orientation-marker characters are employed and in which the computational complexity of orientation-marker-character recognition is one-tenth that of general character recognition, this ratio may be on the order of:

$$\frac{1}{8,000}.$$

As can be appreciated, even with large-magnitude changes in these assumptions, the computational complexity of the orientation-marker-character-based orientation method is generally quite favorable with respect to that of the method illustrated in FIG. 12 for character-based languages that include many thousands of different characters or symbols. It should be noted that, when used in the currently disclosed methods and systems, OCR pattern matching methods used to recognize orientation-marker symbols may, in fact, be associated with a much smaller computational overhead than full character recognition, since orientation-marker characters are chosen, in part, for their asymmetry, which contributes to ease of identification.

Furthermore, because the pattern matching is carried out, during the orientation method, for determining orientation rather than uniquely identifying characters, the method can remain quite robust in the face of a level of character-recognition errors that would be unacceptable for actual character recognition. It should be noted that, in certain implementations, fewer than mn text-character images may need to be evaluated with respect to the orientation-marker-character set in order to reliably determine the orientation of the text-containing region. The number of orientation-marker patterns used by implementations of the text-containing image-region methods and systems to which the current application is directed may range from 2 or 3 to tens or hundreds of characters, and is generally far less than the total number of patterns used to computationally represent the language, generally less than 10 percent of the total number of patterns used to computationally represent the language and often less than 1 percent or even 0.1 percent of the total number of patterns used to computationally represent the language.

Figure 21A:
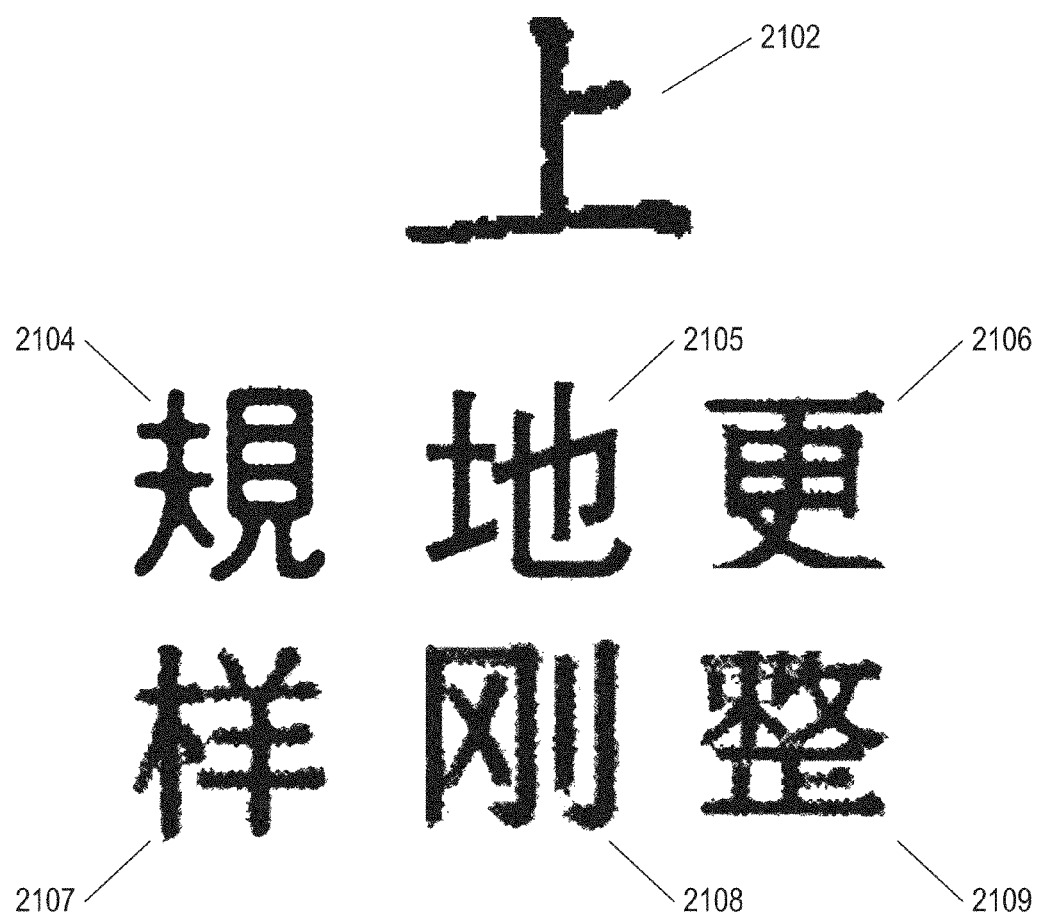
FIGS. 21A-B shows some example orientation-marker characters and orientation-marker-pattern data structures.
Figure 21B:
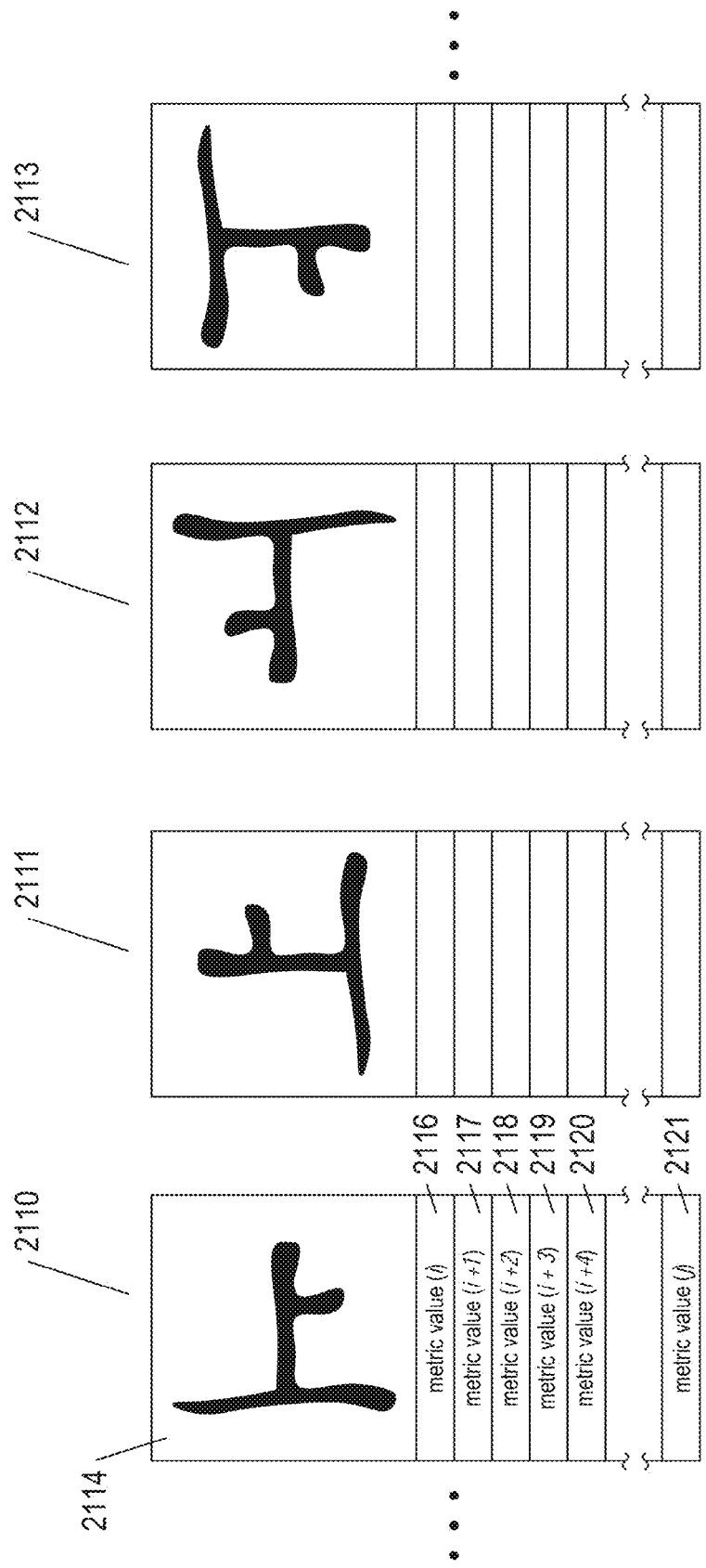

FIGS. 21A-B shows some example orientation-marker characters and orientation-marker-pattern data structures. FIG. 21A shows some example orientation-marker characters. These include an orientation-marker character 2102 selected from the Japanese language as well as six orientation-marker characters 2104-2109 selected from Mandarin.

FIG. 21B shows representations of data structures that may be used to store orientation-marker patterns. FIG. 21B shows four different orientation-marker patterns 2110-2113 for each of four different possible orientations of the orientation-marker character previously illustrated in FIGS. 15, 17, 18, and 19A-B. Each orientation-marker-pattern data structure, such as orientation-marker-pattern data structure 2110, includes a binary representation of the character in a particular orientation 2114 and metric values for j different metrics 2116-2121, where j may be 2, 5, 10, 100, 200, or a larger integer and is between 100 and 300 for many implementations. In addition, the orientation-marker-pattern data structure may contain additional information not shown in FIG. 21B, including a symbol identifier, an orientation identifier, and a weight for each of the j metrics. This additional information may alternatively be encoded in index data structures and other external data structures. However stored, each orientation-marker pattern is associated with a bit-map representation or another type of graphical representation, j computed metric values and associated weights, an orientation, and a symbol identifier, such as the corresponding Unicode representation of the character. In one implementation, an entire set of patterns for a language is used by OCR routines, including patterns for each orientation of each character. They are generally stored in an array or other simple data structure and indexed by symbol ID and orientation, or indexed by symbol ID, with patterns for different orientations of a symbol placed at known array offsets.

Next, one implementation of the method and system to which the current application is directed is described using control-flow diagrams. Again, at the onset, it should be noted that this represents one of many possible implementations of an orientation-marker-character-based text-containing-region orientation method and system, and that many other implementations are possible.

Figure 22A:
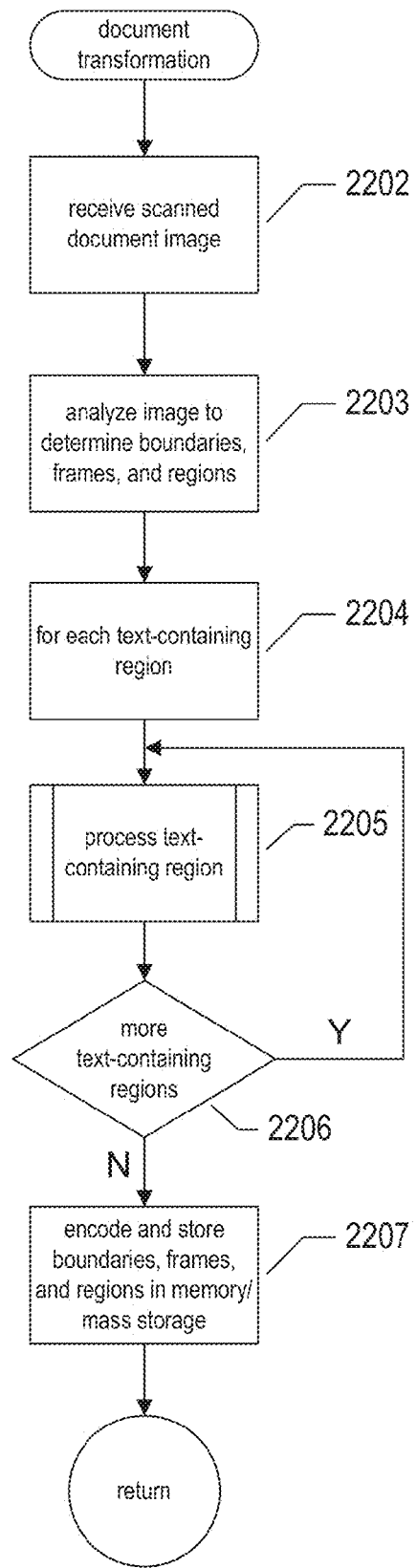
FIG. 22A shows a control-flow diagram for a document-transformation routine which transforms a scanned-document image into a file suitable for input to a word-processing program or other electronic-document-processing program or routine.

FIG. 22A shows a control-flow diagram for a document-transformation routine which transforms a scanned-document image into a file suitable for input to a word-processing program or other electronic-document-processing program or routine. This is an example of the type of system within which the currently disclosed orientation-marker-character-based text-containing-region-orientation method can be incorporated. It should also be noted that the orientation-marker-character-based method disclosed in the current application may be implemented as a set of computer instructions that are stored in a mass-storage device or removable mass-storage medium and that are read into an electronic memory and executed by one or more processors within an electronic processor-controlled device. Alternatively, the method may be implemented in hardware logic circuits, firmware, or a combination of stored computer instructions, hardware circuitry, and firmware. When implemented as a set of computer instructions, the computer instructions constitute a tangible, physical, and non-abstract component of a specialized processor-controlled machine that orients text-containing regions in scanned-document images and other text-containing-image regions prior to undertaking optical character recognition or other processes that operate on oriented text-containing image regions. Occasionally, various types of statements with regard to "software" continue to be encountered in which computer instructions that implement the control components of electromechanical devices are characterized as "software only" or "abstract." Those familiar with modern computer science, electrical engineering, and almost any other modern technological or scientific field recognize that control components implemented as stored computer instructions are in no way abstract or of lesser importance or stature than power supplies, processors, and any of the other many components of modern electromechanical devices.

In step 2202, the document-transformation routine receives a scanned-document image. As discussed above, the scanned-document image is generally a formatted digital file that includes header information as well as the values of a two-dimensional matrix or array of pixels. Next, in step 2203, the document-transformation routine analyzes the received scanned-document image to recognize various boundaries, frames, and other non-text region-specifying information as well as the various different regions of the scanned document. This type of analysis may employ a variety of different image-processing techniques, including application of differential operators, discrete Fourier transforms, and statistical methods. The details of these techniques are beyond the scope of the current discussion. Next, in the for-loop of steps 2204-2206, the document-transformation routine processes each text-containing region by calling the routine "process text-containing region" in step 2205, the processing including OCR methods for converting text images into Unicode encodings or other types of text encodings. Finally, in step 2207, the document-transformation routine encodes and stores commands for generating the various recognized boundaries, frames, and other non-text objects recognized in the scanned-document image as well as data that represents the contents of the various identified regions, including text-containing regions, and stores these commands and data in an electronic file in a mass-storage device, removable mass-storage medium, or electronic memory. As discussed above, the document-transformation routine thus converts an image file that stores a scanned image into a file that stores an electronic document suitable for input to a word-processing program or other type of program that operates on various types of encoded electronic-document information.

Figure 22B:
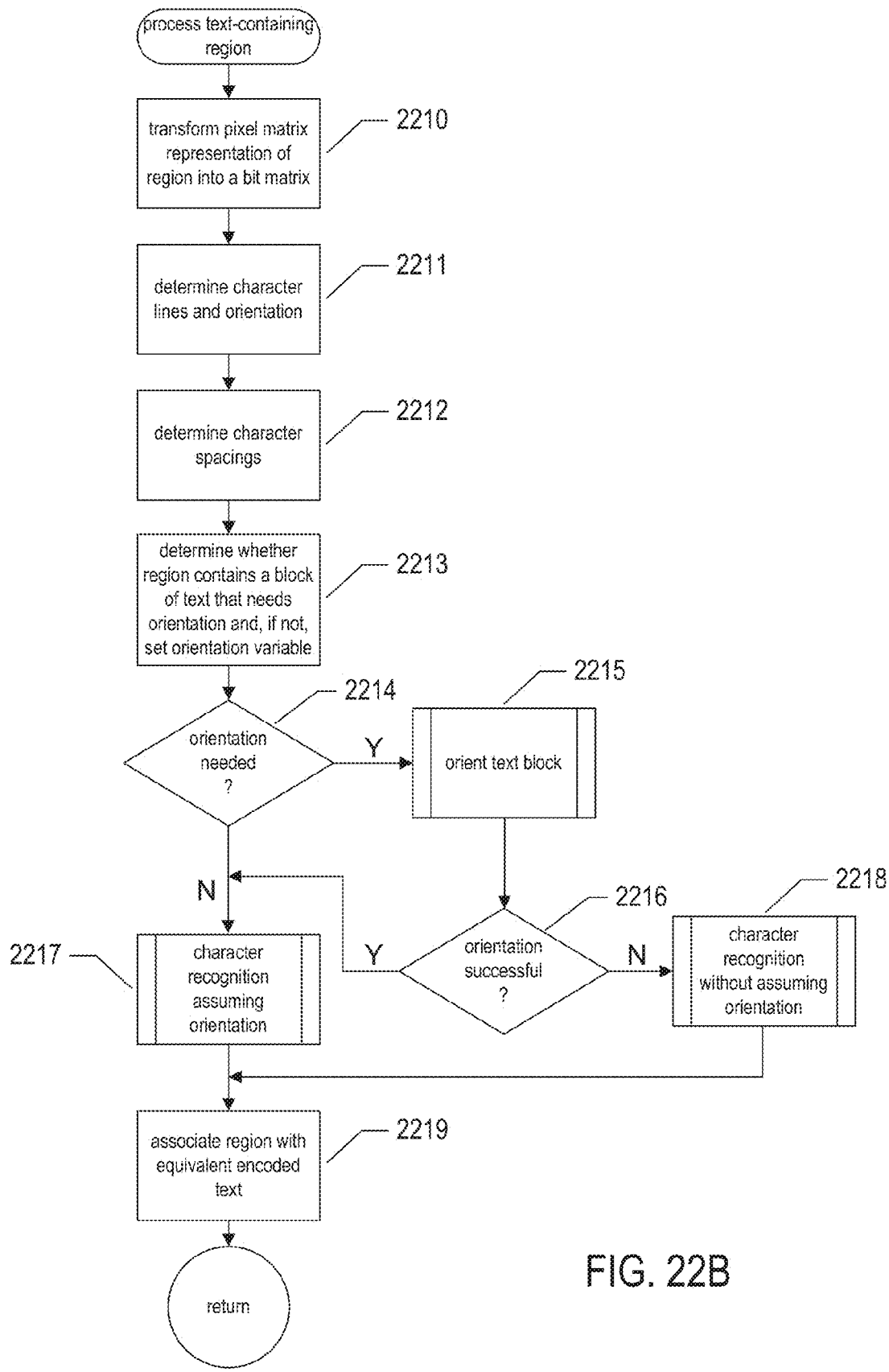
FIG. 22B shows a control-flow diagram for the routine "process text-containing region" called in step 2205 in FIG. 22A.

FIG. 22B shows a control-flow diagram for the routine "process text-containing region" called in step 2205 in FIG. 22A. In step 2210, the routine "process text-containing region" transforms the pixel-based matrix representation of a text-containing region into a bit matrix, as discussed above and as referred to as "binarization." Next, in step 2211, the routine "process text-containing region" undertakes an initial-orientation process, one example of which is discussed with reference to FIGS. 8-10. In step 2212, the routine "process text-containing region" determines character spacings, as also discussed above. Next, in step 2213, the routine "process text-containing region" determines whether the initially oriented region contains a block of text that needs additional orientation. When no additional orientation is needed, an orientation variable "oriented" is set to the Boolean value TRUE to indicate that additional orientation processing is not required. When additional orientation is needed, as determined in step 2214, then the routine "orient text block" is called in step 2215. The determination made in step 2213 may be complex and may involve a variety of different lower-level considerations. For example, when the text-containing region contains a single line of text that is already horizontally oriented, and when the language of the text does not support vertical writing of text characters or symbols, then the routine may decide that a best possible orientation has already been achieved in the initial-orientation step. In other cases, the aspect ratio of the text block, the degree of alignment of characters and symbols in vertical directions versus horizontal directions, whether or not the beginning and ending symbols or characters in each line are vertically aligned, and other such information may be considered in order to determine whether or not the text-containing region has been adequately oriented in the initial-orientation step. When additional orientation is needed, and following the call to the routine "orient text block" in step 2215, the routine "process text-containing region" determines whether or not a successful additional orientation has been achieved, in step 2216. When successful orientation has been achieved, or when no additional orientation was needed, the routine "process text-containing region" calls a character-recognition routine that assumes a proper orientation, in step 2217. Otherwise, a character-recognition routine is called, in step 2218, which does not assume proper orientation of the text-containing region. In either case, the character-recognitions routine transforms images of characters and symbols in the text-containing region into Unicode character representations or other standard character representations. Finally, in step 2219, the equivalent, encoded text symbols are associated with the region for use by the document-transformation routine, illustrated in FIG. 22A, in generating an electronic-document file.

Figure 22C:
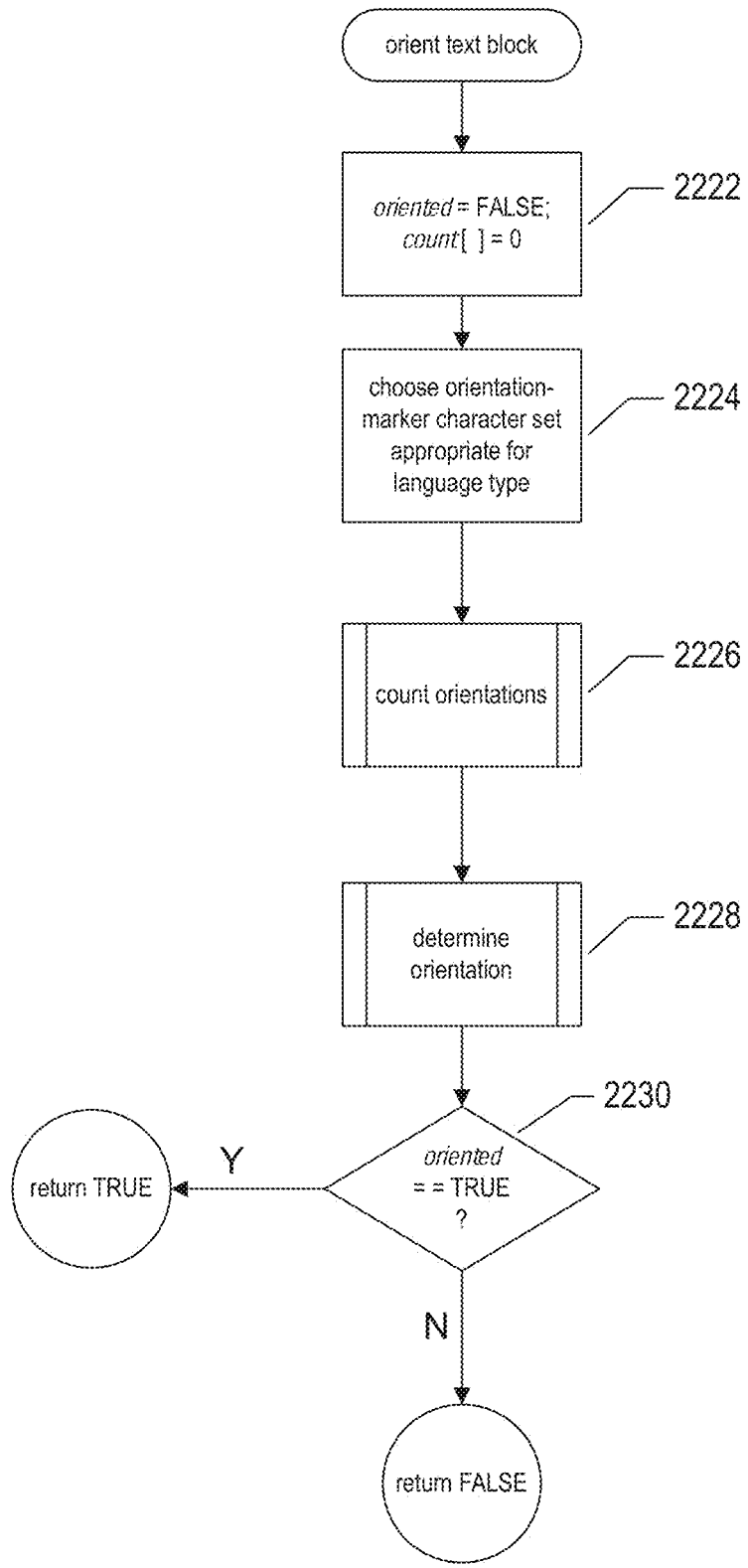
FIG. 22C provides a control-flow diagram for the routine "orient text block" called in step 2215 of FIG. 22B.
Figure 22D:
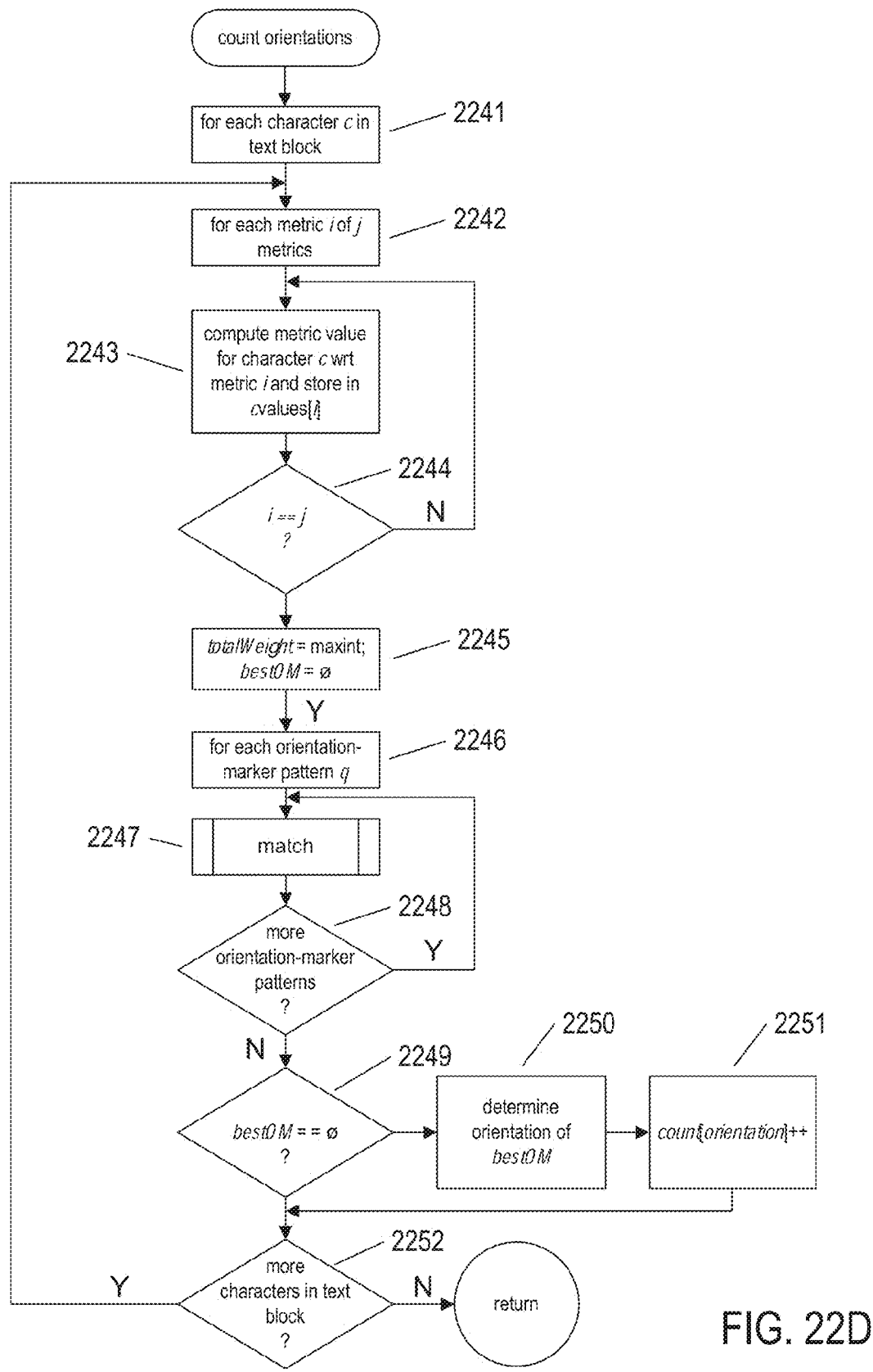
FIG. 22D provides a control-flow diagram for the routine "count orientations" called in step 2226 of FIG. 22C.
Figure 22E:
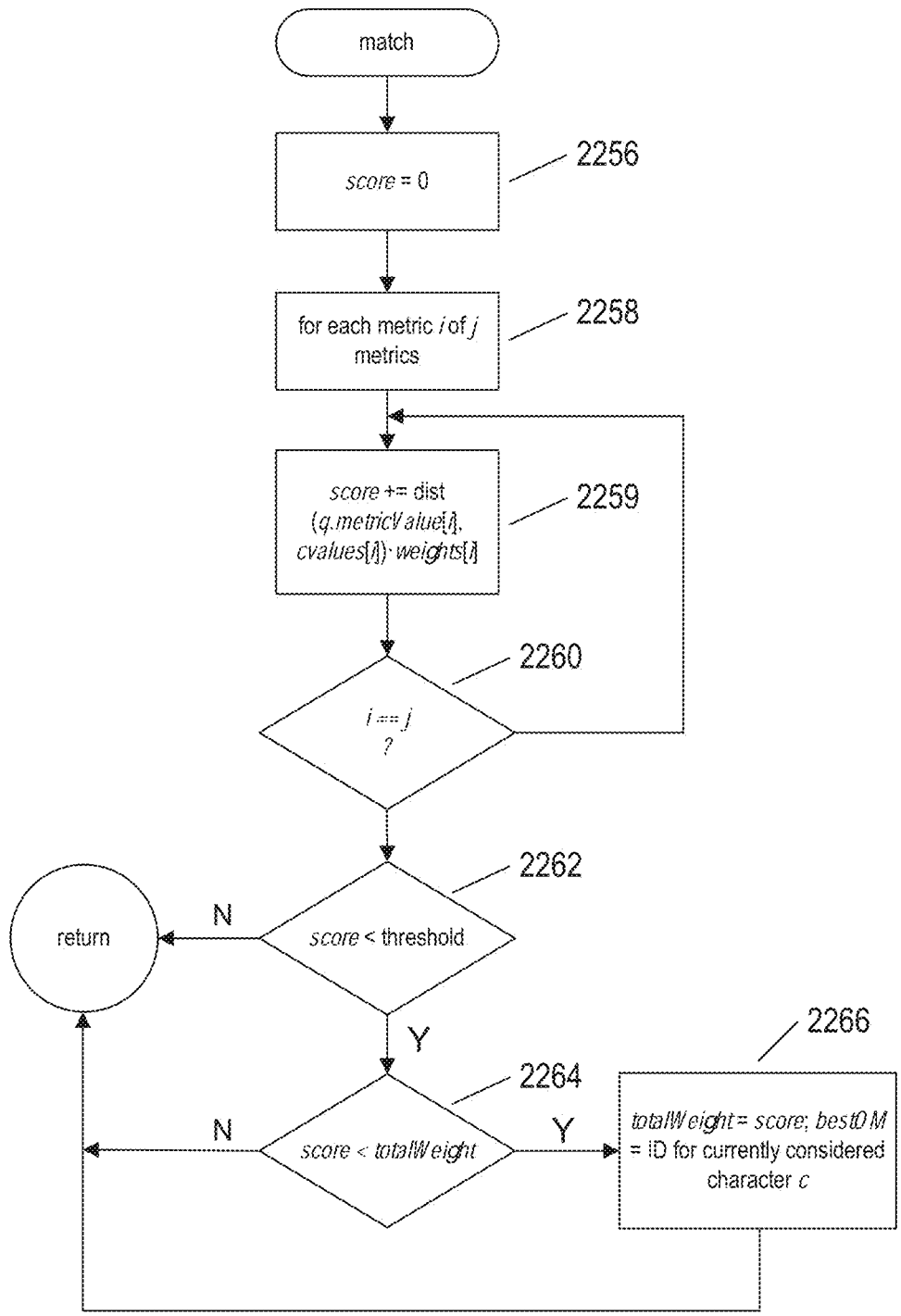
FIG. 22E provides a control-flow diagram for the routine "match" called in step 2247 of FIG. 22D.
Figure 22F:
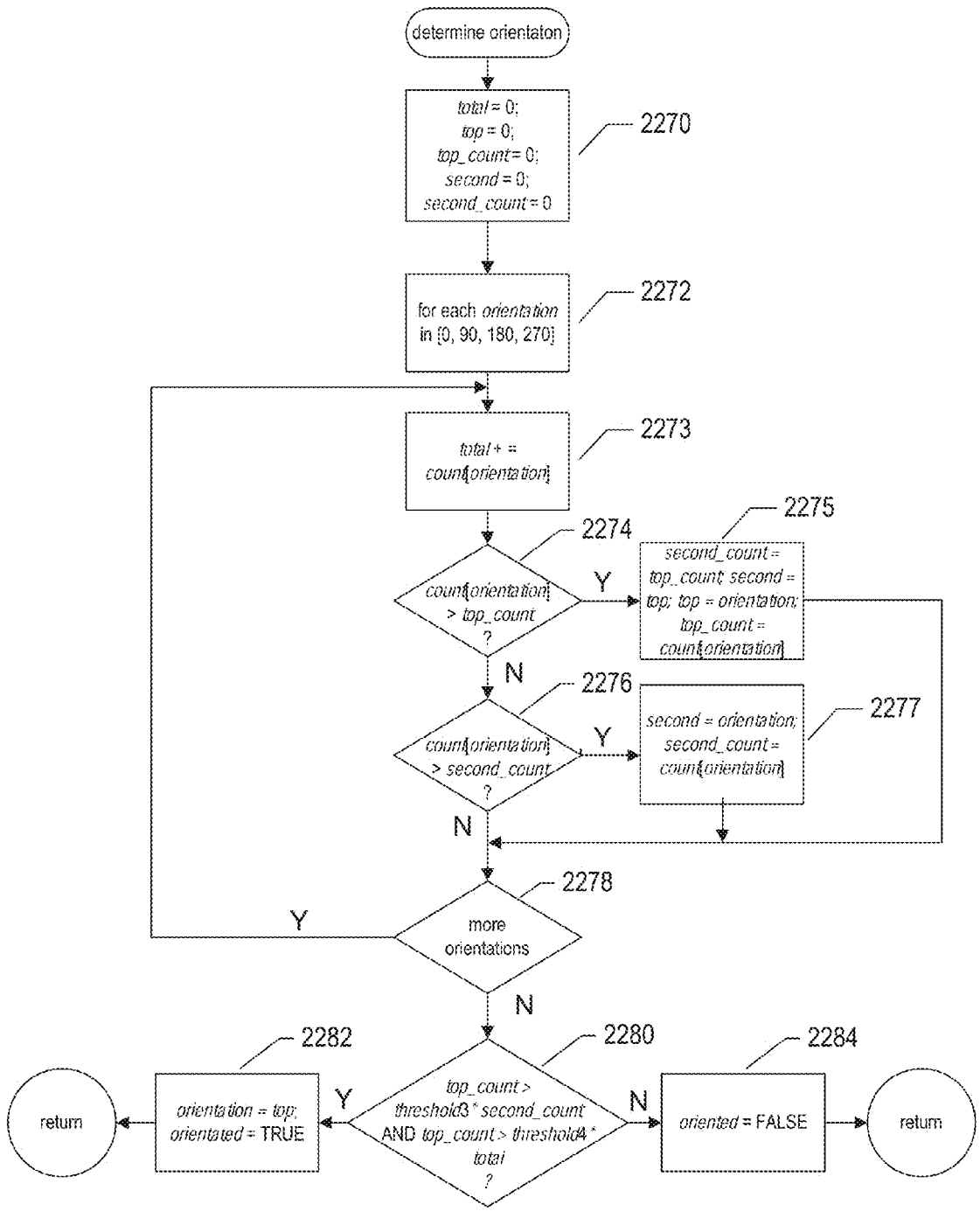
FIG. 22F provides a flow-control diagram for the routine "determine orientation" called in step 2228 of FIG. 22C.

FIG. 22C provides a control-flow diagram for the routine "orient text block" called in step 2215 of FIG. 22B. This routine, illustrated in FIG. 22C and subsequently discussed with respect to FIGS. 22D-F, represents one implementation of the orientation-marker-pattern-based text-containing-image-region orientation method disclosed in the current application. In step 2222, the routine "orient text block" sets an orientation variable oriented to FALSE and sets all of the elements of the array count to zero. Then, in step 2224, the routine "orient text block" chooses an initial orientation-marker-character set and corresponding orientation-marker-pattern set, discussed above with reference to FIG. 20, for the language of the text in the text-containing region. In step 2226, the routine "orient text block" counts the various orientations of orientation-marker characters identified in the text-containing region in the array count and, in step 2228, determines an orientation for the text-containing region based on the counts of orientations of the identified orientation-marker characters stored in the array count, as in the example shown in FIG. 20, where the array count 2008 stores the counts of the orientations of recognized orientation-marker characters. When the orientation determination is successful, as determined in step 2230, then the routine "orient text block" returns TRUE, and otherwise returns FALSE.

FIG. 22D provides a control-flow diagram for the routine "count orientations" called in step 2226 of FIG. 22C. In the outer for-loop of steps 2241-2252, each character image c in the text-containing region is considered. In the for-loop of steps 2242-2244, the routine "count orientations" computes metric values for the currently considered character image c for j metrics and stores the values in the array cvalues. Note that, in the case of certain types of metrics, like the o-metric, referred to as "binary metrics," the metric is computed using both the character image c and an orientation-marker pattern q. For these types of metrics, the metric value is computed later, in for-loop of steps 2258-2260 in FIG. 22E, described below. In step 2245, the routine "count orientations" initializes variables totalWeight to some large integer and bestOM to Ø. Then, in the for-loop comprising steps 2246-2248, the routine "count orientations" considers each of the different orientation-marker patterns in the set of orientation-marker patterns corresponding to the selected set of orientation-marker characters and attempts to match each orientation-marker pattern q to the currently considered character c. Following completion of the for-loop of steps 2246-2248, in step 2249, the routine "count orientations" determines whether or not the variable bestOM still contains the value Ø. When the variable bestOM does not contain the value Ø, then, in step 2250, the routine "count orientations" determines the orientation of the orientation-marker pattern referenced by a symbol ID contained in variable bestOM and, in step 2250, increments the count of observations of that orientation in the array count. When there are more character images c to consider, as determined in step 2252, control returns to step 2243. Otherwise, the routine "count orientations" returns. In an alternative implementation, the outer for-loop may iterate only until a sufficient number of orientations have been determined to select an orientation for the text-containing region with greater than a threshold probability of correctness.

FIG. 22E provides a control-flow diagram for the routine "match" called in step 2247 of FIG. 22D. In the for-loop of steps 2258-2260, the routine "match" computes a score for the currently considered character c and the currently considered orientation-marker pattern q in the for-loop of steps 2246-2248 in FIG. 22D. The score, stored in variable score, is the sum of weighted distances between metric values computed for the currently considered character image c, stored in the array cvalues, and corresponding metric values for the currently considered orientation-marker pattern q. Note that, in the case of certain types of metrics, like the o-metric, the metric is computed using both the character image c and an orientation-marker pattern q, in step 2259, with the computed metric value representing a distance, rather than computing separate metric values for the character image c and the orientation-marker pattern q and then computing the distance between the two computed metric values. For these types of metrics, the computed metric value is multiplied by a weight and added to the score in step 2259. When the computed score is less than a threshold value, as determined in step 2262, and the computed score is less than the current best observed score stored in totalWeight, as determined in step 2264, the currently considered orientation-marker pattern q is the best match so far observed for the currently considered character image c and the variables totalWeight and bestOM are accordingly updated, in step 2266, to record that fact. Note that the values of the weights are either stored in the orientation-marker-pattern data structure for the orientation-marker pattern q or are stored in another data structure or memory region. The weights are used to favor metrics that best discriminate orientation-marker pattern q from images of other characters and from other orientations of the character corresponding to orientation-marker pattern q.

FIG. 22F provides a flow-control diagram for the routine "determine orientation" called in step 2228 of FIG. 22C. In step 2270, the routine "determine orientation" sets variables total, top, top_count, second, and second_count to 0. In the for-loop of steps 2272-2278, the routine "determine orientation" considers the count of orientations in the array count. In step 2273, the routine "determine orientation" adds the count for each orientation to the variable total. In steps 2274-2275, when the currently considered orientation count is greater than the value stored in the variable top_count, the variable second_count is set to the value currently in variable top_count and the value in variable second is set to the value stored in variable top, following which the variable currently in variable top is set to the currently considered orientation and the variable top_count is set to the observed number of orientation-marker characters, stored in the array count, for the currently considered orientation. Otherwise, in steps 2276-2277, when the count of orientation-marker characters having the currently considered orientation is greater than the value stored in the variable second_count, then the variable second is set to the currently considered orientation and the variable second_count is set to the number of orientation-marker characters with the currently considered orientation, stored in the array count and indexed by the currently considered orientation. Following completion of the for-loop of steps 2272-2278, the routine "determine orientation" determines, in step 2280, whether the current value of top_count is greater than a first threshold times the value currently stored in the variable second_count and whether the value currently stored in the variable top_count is greater than a second threshold times the value currently stored in the variable total. When this is the case, then the orientation stored in variable top was observed at a significantly higher frequency than the next most frequently observed orientation and was observed with a sufficiently high frequency among all recognized orientation-marker characters to be deemed the proper orientation for the text-containing region. Therefore, in step 2282, a global variable orientation is set to the value stored in the variable top and the orientation variable "oriented" is set to TRUE. Otherwise, the orientation variable "oriented" is set to FALSE, in step 2284.

Figure 23A:
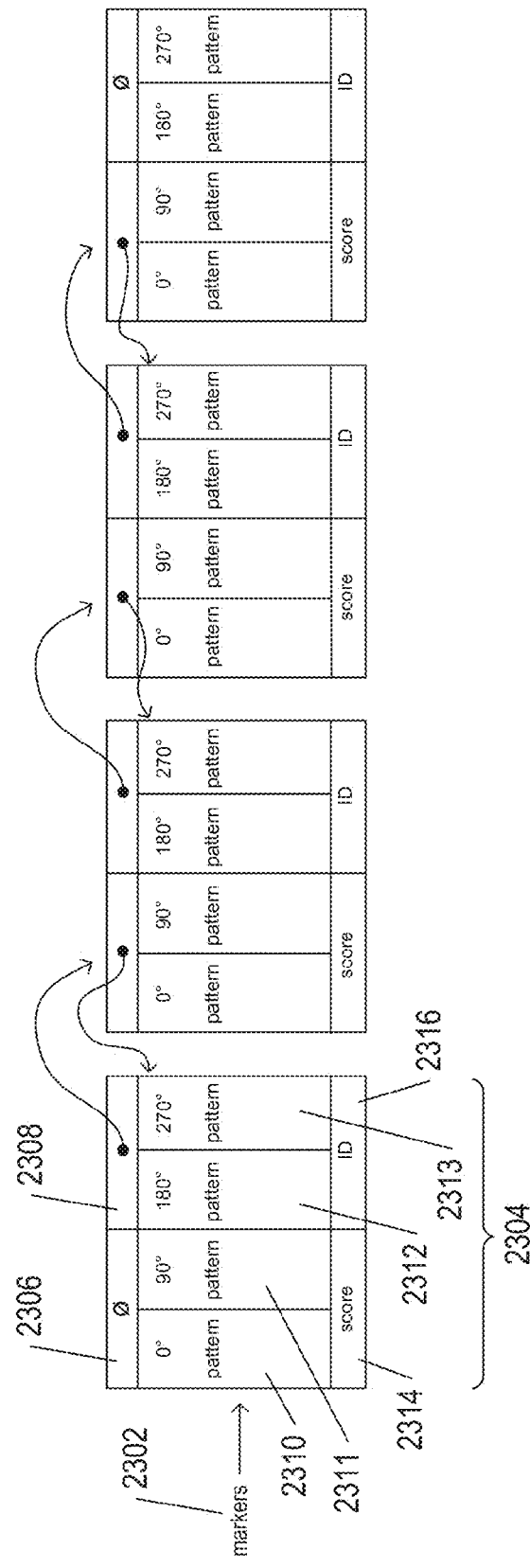
FIG. 23A illustrates a data structure in which an orientation-marker-character set is stored.

Next, a description of a method for selecting orientation-marker characters for one or more languages is described. FIG. 23A illustrates a data structure in which an orientation-marker-character set is stored as it is constructed. The data structure is a doubly linked list, the first element of which is referenced by a variable markers 2302. Each data structure in the doubly linked list of data structures includes a backward pointer 2306, a forward pointer 2308, four orientations-marker patterns for four orientations of an orientation-marker character 2310-2313, a score 2314, and an identifier for the character 2316.

Figure 23B:
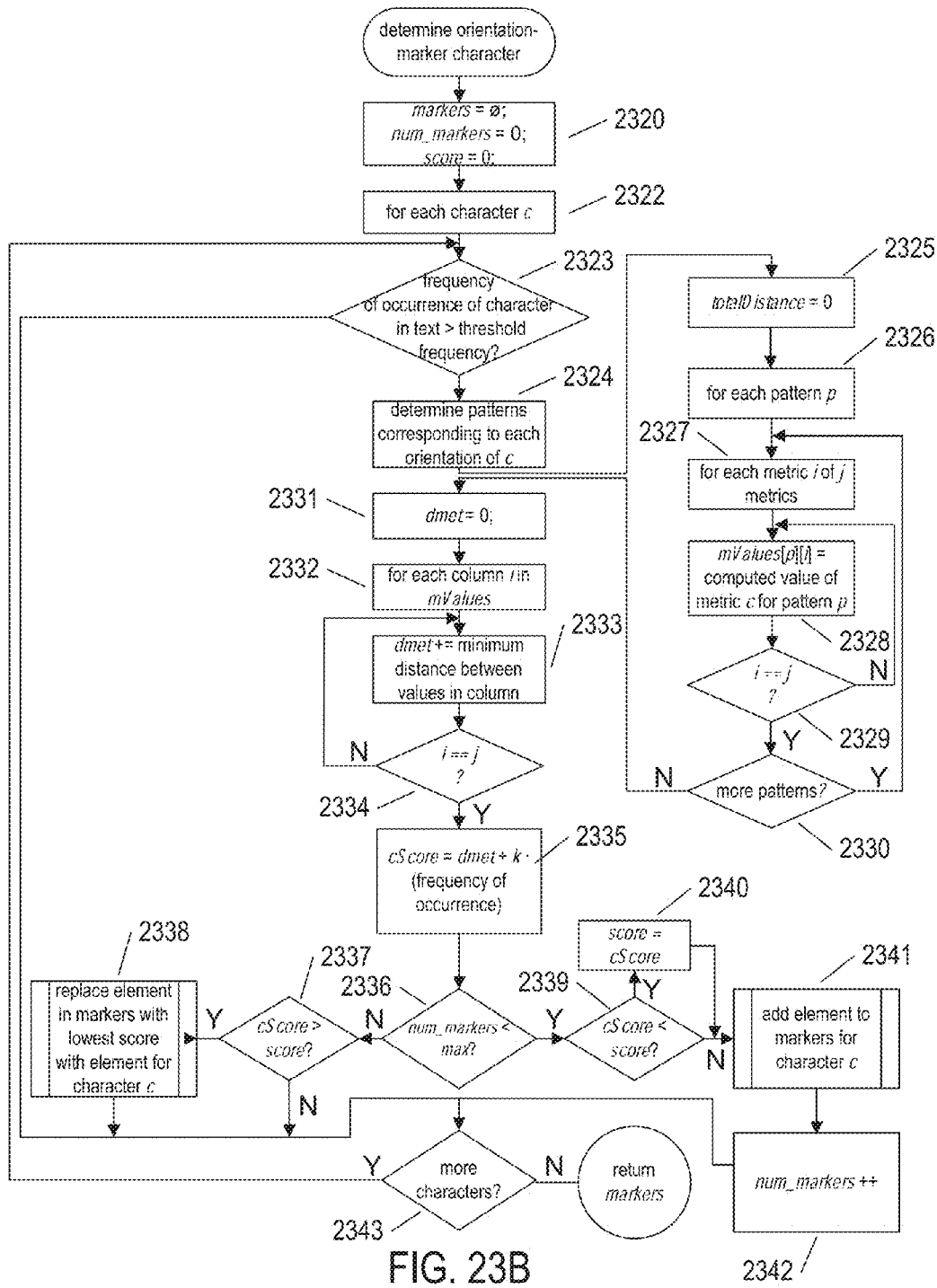
FIG. 23B provides a control-flow diagram for a routine "determine orientation-marker characters" which determines a set of orientation-marker characters for a particular language or set of languages.

FIG. 23B provides a control-flow diagram for a routine "determine orientation-marker characters" which determines a set of orientation-marker characters for a particular language or set of languages. In step 2320, the variable markers is set to Ø and variables num_markers and score are both set to 0. Next, in the for-loop of steps 2322-2343, each character in a language is considered. In step 2323, the routine determines whether or not the frequency of occurrence of the character in text is greater than a threshold frequency. When the frequency of occurrence of the currently considered character is below the threshold value, then the character is dismissed from being considered a candidate for the orientation-marker-character set, with control flowing to step 2343, the final step of the for-loop of steps 2322-2343. Otherwise, in step 2324, the routine "determine orientation-marker characters" determines orientation-marker patterns for each of the possible orientations of the character c. In step 2325, the routine "determine orientation-marker characters" sets the variable totalDistance to 0. Then, in the nested for-loops of steps 2326-2330, the routine "determine orientation-marker characters" computes the metric value for each of j metrics with respect to each of the orientation-marker patters p and stores the computed metric values in the array mValues. In step 2331, the variable dmet is set to 0. Then, in the for-loop of steps 2332-2334, the routine "determine orientation-marker characters" computes, and stores in variable dmet, a sum of the minimum distances between metric values computed for each of the metrics and for all of the orientation-marker patterns included in each column of the array mValues. In step 2335, the routine "determine orientation-marker characters" computes a score for the currently-considered character c, stored in variable cScore. The greater the score, the better a character c would serve as an orientation-marker character. Although not shown in FIG. 23B, the weight used for a metric i in computing a match score, in step 2259 of FIG. 22E, may be determined for orientation-marker patterns based on the computed minimum distance between metric values computed for the orientation-marker patterns corresponding to an orientation-marker character. The smaller the minimum distance, the smaller the weight. When the number of orientation-marker characters currently included in the set of orientation-marker characters, stored in variable num_markers, is greater than or equal to some maximum desired number of orientation-marker characters, as determined in step 2336, then, in step 2337, when the score computed for the currently considered character is greater than the lowest score of any character in the set of orientation-marker characters, stored in variable score, then, in step 2338, the element in the doubly-linked list with the lowest score is replaced by an element for the currently-considered character c. Otherwise, in step 2339, when the score computed for the currently considered character is less than the value stored in variable score, variable score is updated to store the score computed for the currently considered character c, in step 2340. In step 2341, a new element for the currently-considered character c is entered into the doubly-linked list referenced by variable markers. Following completion of the for-loop of steps 2322-2346, markers is returned as the orientation-marker-character set.

In other implementations, orientation-marker character sets may be determined by other automatic methods, by semi-automated methods in which a user participates in either or both of initial orientation-marker-character selection and evaluation, and by largely manual methods in which a user selects and evaluates candidate orientation-marker characters and then chooses a final set of orientation-marker characters. However selected, orientation-marker character sets stored in physical data-storage devices along with instructions for applying orientation-marker character sets to orient text-containing image regions represent useful components of OCR systems.

Although the present invention has been described in terms of particular embodiments, it is not intended that the invention be limited to these embodiments. Modifications within the spirit of the invention will be apparent to those skilled in the art. For example, any number of different implementations of the currently disclosed orientation-marker-character-based text-containing-image-region orientation method can be obtained by varying any of many different implementation and design parameters, including programming language, operating system, data structures, control structures, variables, modular organization, and other such design and implementation parameters. As discussed above, any of a wide variety of different methods and metrics can be used to identify orientation-marker characters in a text-containing-image region and to determine the orientations of these orientation-marker characters. A variety of different thresholds can be used to determine when an orientation-marker character matches with a character image and to determine when an orientation for the text-containing region can be ascertained based on counts of orientation-marker-character orientations recognized in the text-containing region. Although the above-discussed and above-illustrated orientation method and routine determines an orientation for a text-containing region, the above-discussed method may be applied to various different types and sizes of regions, including single text lines or columns, blocks of text characters, entire pages of text, and other types of text-containing regions. In the above-described method, each text-character in a text-containing region is attempted to be matched by each possible orientation of each orientation-marker character, but, in alternative methods and systems, only a portion of the text-characters in a text-containing region may need to be attempted to be matched by each possible orientation of each orientation-marker character, the portion determined by a probability of the orientation being uniquely determined from the portion exceeding a threshold value.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An image processing system that determines an orientation for a text-containing region of an image, the image processing system comprising:
    one or more processors;
    one or more electronic memories;
    one or more mass-storage devices;
    an orientation-marker pattern set stored in one or more of the one or more electronic data storage devices, wherein the orientation-marker pattern set comprises two or more patterns corresponding to two or more considered orientations of one or more orientation-marker characters; and
    computer instructions stored in the one or more electronic data storage devices that control the image processing system to
        receive an image with a text-containing region,
        store a representation of the text-containing region in one or more of the one or more electronic memories,
        identify one or more text-character images within the text-containing region that match an orientation-marker pattern from the orientation-marker pattern set, and
        determine an orientation for the text-containing region from the orientations of the one or more text-character images that match the orientation-marker pattern.

2. The image processing system of claim 1 wherein the number of orientation-marker patterns in the orientation-marker-pattern set is less than 10% of the total number of patterns used to represent text symbols.

3. The image processing system of claim 1 wherein the number of orientation-marker patterns in the orientation-marker-pattern set is less than 1% of the total number of patterns used to represent text symbols.

4. The image processing system of claim 1 wherein the number of orientation-marker patterns in the orientation-marker-pattern set is less than 0.1% of the total number of patterns used to represent text symbols.

5. The image processing system of claim 1 wherein the orientation-marker is characters are asymmetric and a frequency of occurrence in text greater than a threshold frequency.

6. The image processing system of claim 1 wherein identifying the one or more text-character images within the text-containing region that match the orientation-marker pattern from the orientation-marker pattern set further comprises:

for a second number of text-character images within the text-containing region,
  computing a number j of metric values for j different metrics with respect to the text-character image;
for one or more orientation-marker patterns of the orientation-marker pattern set,
  determining a match score with respect to the text-character image, and
  when the determined match score is less than a threshold value and when the match score is smaller than the smallest match score previously determined with respect to the text-character image, storing the match score as the smallest match score and a reference to the orientation-marker pattern as the best matching pattern.

7. The image processing system of claim 6 wherein determining a match score with respect to the text-character image further comprises:
  determining a sum of weighted distances between the j computed metric values and j corresponding metric values for the orientation-marker pattern.

8. The image processing system of claim 7 wherein each of the j metrics is a function that is computed from a bit-map representation of either an orientation-marker pattern or a text-character image.

9. The image processing system of claim 1 wherein determining an orientation for the text-containing region from the orientations of the one or more text-character images that match the orientation-marker pattern further comprises:
  for the one or more text-character images, determining an orientation associated with the text-character image as an orientation of the orientation-marker pattern that matches the text-character image; and
  selecting, as the determined orientation, an orientation associated with a greatest number of the text-character images.

10. A method carried out by an image-processing system having
  one or more processors,
  one or more electronic memories,
  one or more mass-storage devices; and
  an orientation-marker pattern set stored in one or more of the one or more electronic data storage devices, wherein the orientation-marker pattern set comprises two or more patterns corresponding to two or more considered orientations of one or more orientation-marker characters,
  the method determining orientation of a text-containing region of an image, the method comprising:
    receiving an image with a text-containing region;
    storing a representation of the text-containing region in one or more of the one or more electronic memories;
    identifying one or more text-character images within the text-containing region that match an orientation-marker pattern from the orientation-marker pattern set, and
    determining an orientation for the text-containing region from the orientations of the one or more text-character images that match the orientation-marker pattern.

11. The method of claim 10 wherein the number of orientation-marker patterns in the orientation-marker-pattern set is less than 0.1%, 1%, or 10% of the total number of patterns used to represent text symbols.

12. The method of claim 11 wherein the orientation-marker characters are asymmetric and have a frequency of occurrence in text greater than a threshold frequency.

13. The method of claim 11 wherein identifying the one or more text-character images within the text-containing region that match the orientation-marker pattern from the orientation-marker pattern set further comprises:
  for a second number of text-character images within the text-containing region,
    computing a number j of metric values for j different metrics with respect to the text-character image;
  for one or more orientation-marker patterns of the orientation-marker-pattern set,
    determining a match score with respect to the text-character image, and
    when the determined match score is less than a threshold value and when the match score is smaller than the smallest match score previously determined with respect to the text-character image, storing the match score as the smallest match score and a reference to the orientation-marker pattern as the best matching pattern.

14. The method of claim 13 wherein determining a match score with respect to the text-character image further comprises:
  determining a sum of weighted distances between the j computed metric values and j corresponding metric values for the orientation-marker pattern.

15. The method of claim 14 wherein each of the j metrics is a function that is computed from a bit-map representation of either an orientation-marker pattern or a text-character image.

16. The method of claim 11 wherein determine an orientation for the text-containing region from the orientations of the one or more text-character images that match the orientation-marker pattern further comprises:
  selecting, as the determined orientation, an orientation most frequently associated with the orientation-marker patterns that match the text-character images.

17. An image processing system that determines an orientation for a text-containing region of an image, the image processing system comprising:
  one or more processors;
  one or more electronic memories;
  one or more mass-storage devices;
  an orientation-marker pattern set stored in one or more of the one or more electronic data storage devices, wherein the orientation-marker pattern set comprises two or more patterns corresponding to two or more considered orientations of one or more orientation-marker characters; and
  computer instructions stored in the one or more electronic data storage devices that control the image processing system to determine an orientation for the text-containing region from orientations of one or more text-character images within the text-containing region that match an orientation-marker pattern from the orientation-marker pattern set.

18. The image processing system of claim 17 wherein the number of orientation-marker patterns in the orientation-marker-pattern set is less than 10% of the total number of patterns used to represent text symbols.

19. The image processing system of claim 1 wherein the number of orientation-marker patterns in the orientation-marker-pattern set is less than 1% of the total number of patterns used to represent text symbols.

20. The image processing system of claim 17 wherein the number of orientation-marker patterns in the orientation-marker-pattern set is less than 0.1% of the total number of patterns used to represent text symbols.

* * * * *